United States Patent
Ogawa

[11] Patent Number: 6,124,981
[45] Date of Patent: Sep. 26, 2000

[54] ATTACHMENT LENS HAVING DIFFRACTION SURFACE

[75] Inventor: Hideki Ogawa, Yokohama, Japan

[73] Assignee: Canon Kabushiki Kaisha, Tokyo, Japan

[21] Appl. No.: 09/213,232

[22] Filed: Dec. 17, 1998

[30] Foreign Application Priority Data

Dec. 24, 1997 [JP] Japan ..................... 9-366425

[51] Int. Cl.$^7$ ................... G02B 15/02
[52] U.S. Cl. ............ 359/675; 359/672; 359/673; 359/674
[58] Field of Search ............... 359/672, 673, 359/674, 675

[56] References Cited

U.S. PATENT DOCUMENTS

| | | | |
|---|---|---|---|
| 5,044,706 | 9/1991 | Chen | 359/357 |
| 5,543,966 | 8/1996 | Meyers | 359/565 |
| 5,726,809 | 3/1998 | Griffith | 359/675 |
| 5,884,108 | 3/1999 | Kamo et al. | 396/315 |
| 5,930,043 | 7/1999 | Ogawa | 359/566 |

Primary Examiner—Georgia Epps
Assistant Examiner—Timothy Thompson
Attorney, Agent, or Firm—Fitzpatrick, Cella, Harper & Scinto

[57] ABSTRACT

An attachment lens satisfactorily corrects aberrations by using a diffraction surface. The attachment lens is installed on an image surface side of a master lens unit (M) serving as a photographic optical system, and it extends a focal length of the master lens unit (M) toward a longer focal length side. The attachment lens has a diffraction surface (D) which is composed of a diffraction grating shaped rotationally symmetrical with respect to an optical axis and which has a negative refractive power with respect to a diffracted light ray of a design order of diffraction. The attachment lens is adapted to satisfy a conditional expression given below when a height of an axial paraxial ray incident upon the diffraction surface, which has the negative refractive power, from an optical axis is denoted as $h_D$, and a height of a pupil paraxial ray incident upon the diffraction surface, which has the negative refractive power, from the optical axis is denoted as $H_D$:

$$|h_D H_D| > h_D^2.$$

14 Claims, 22 Drawing Sheets

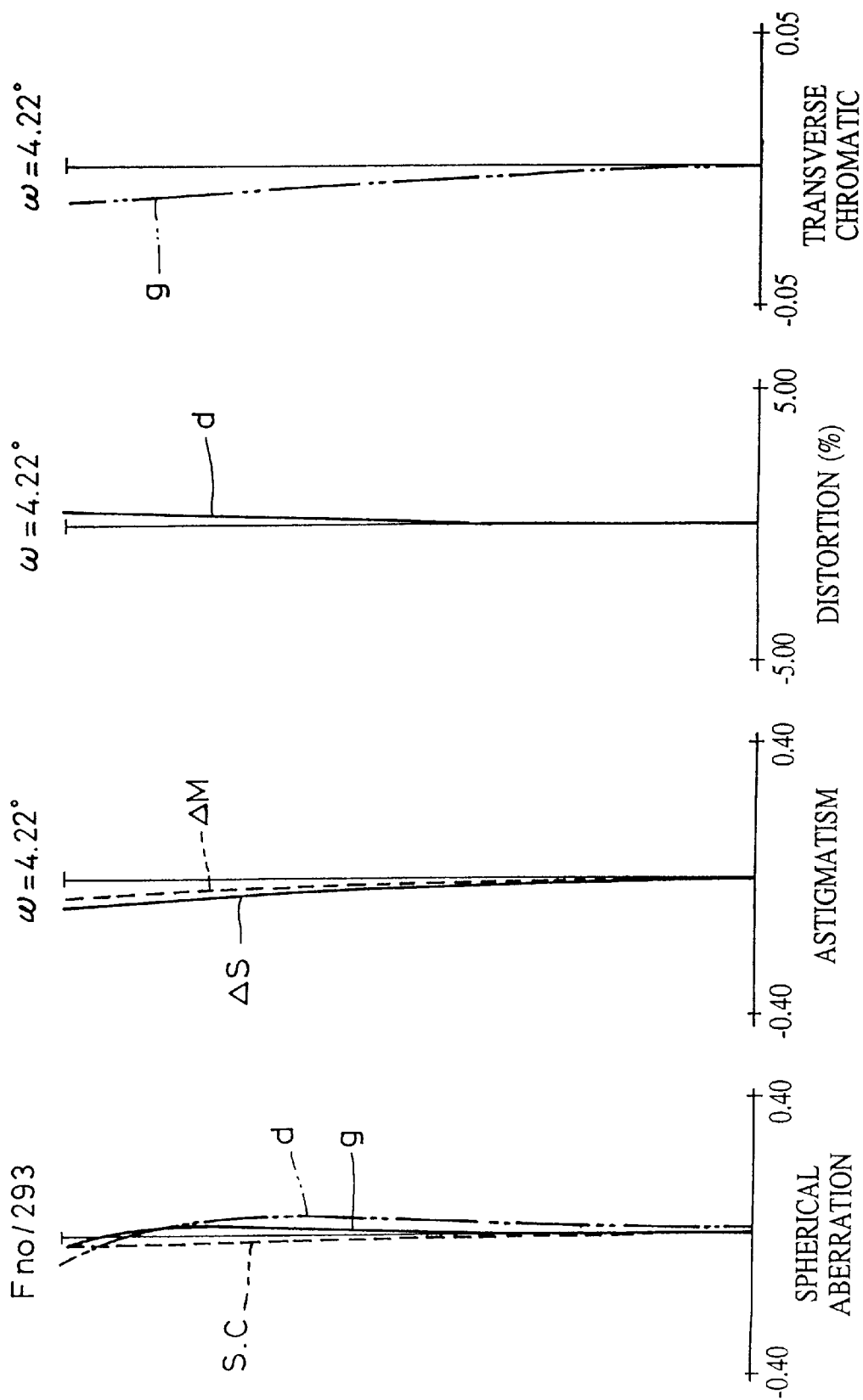

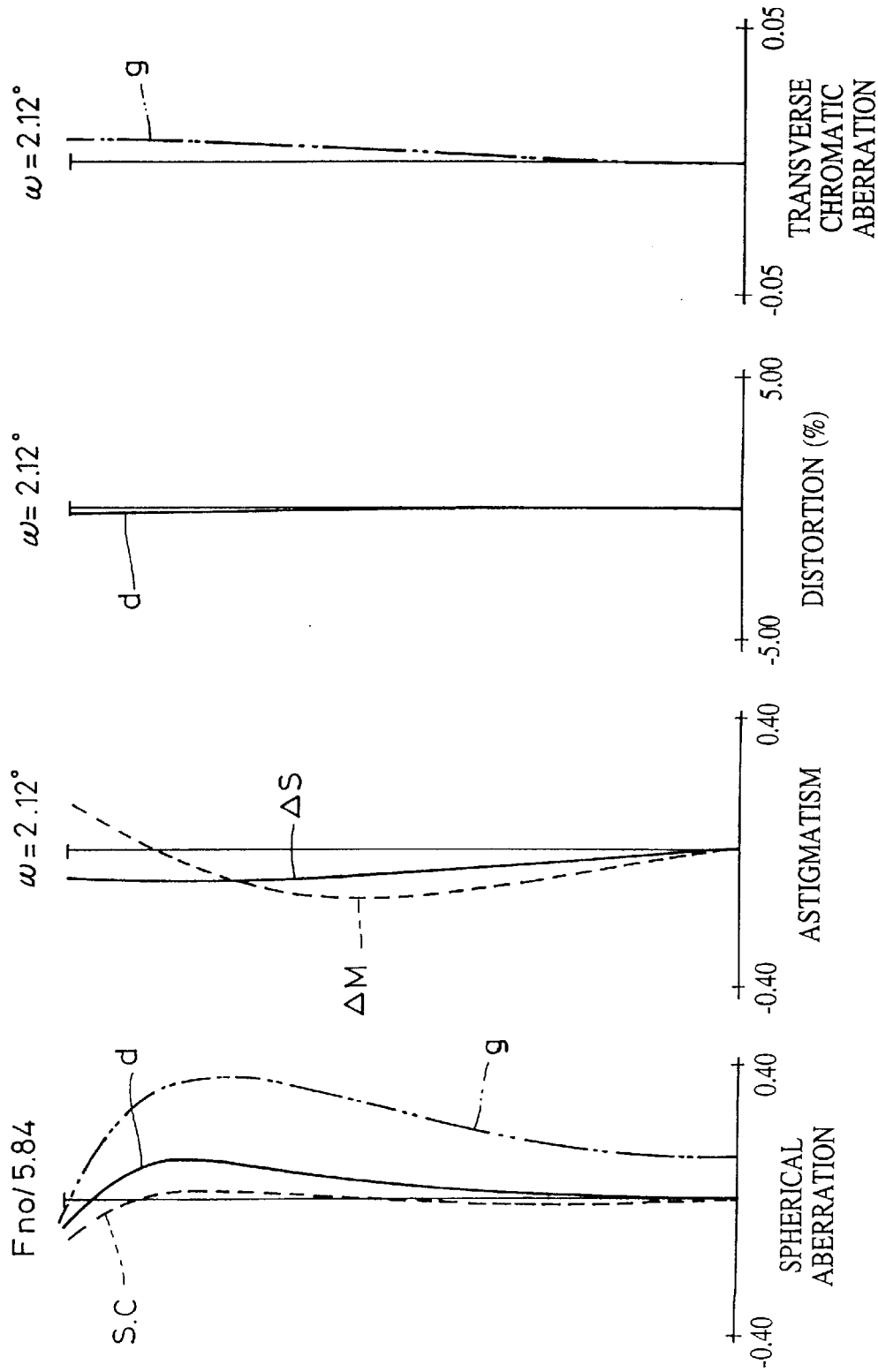

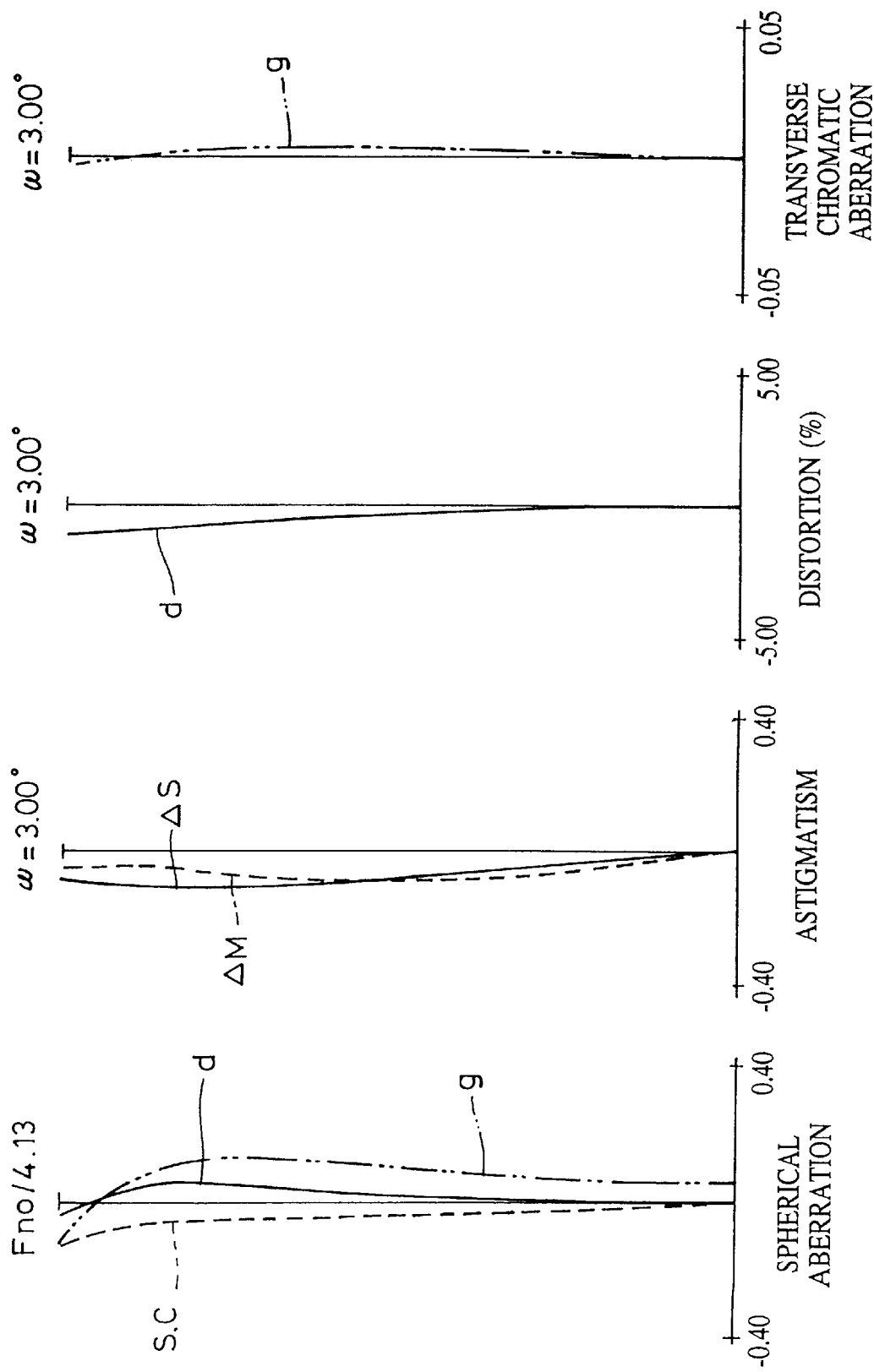

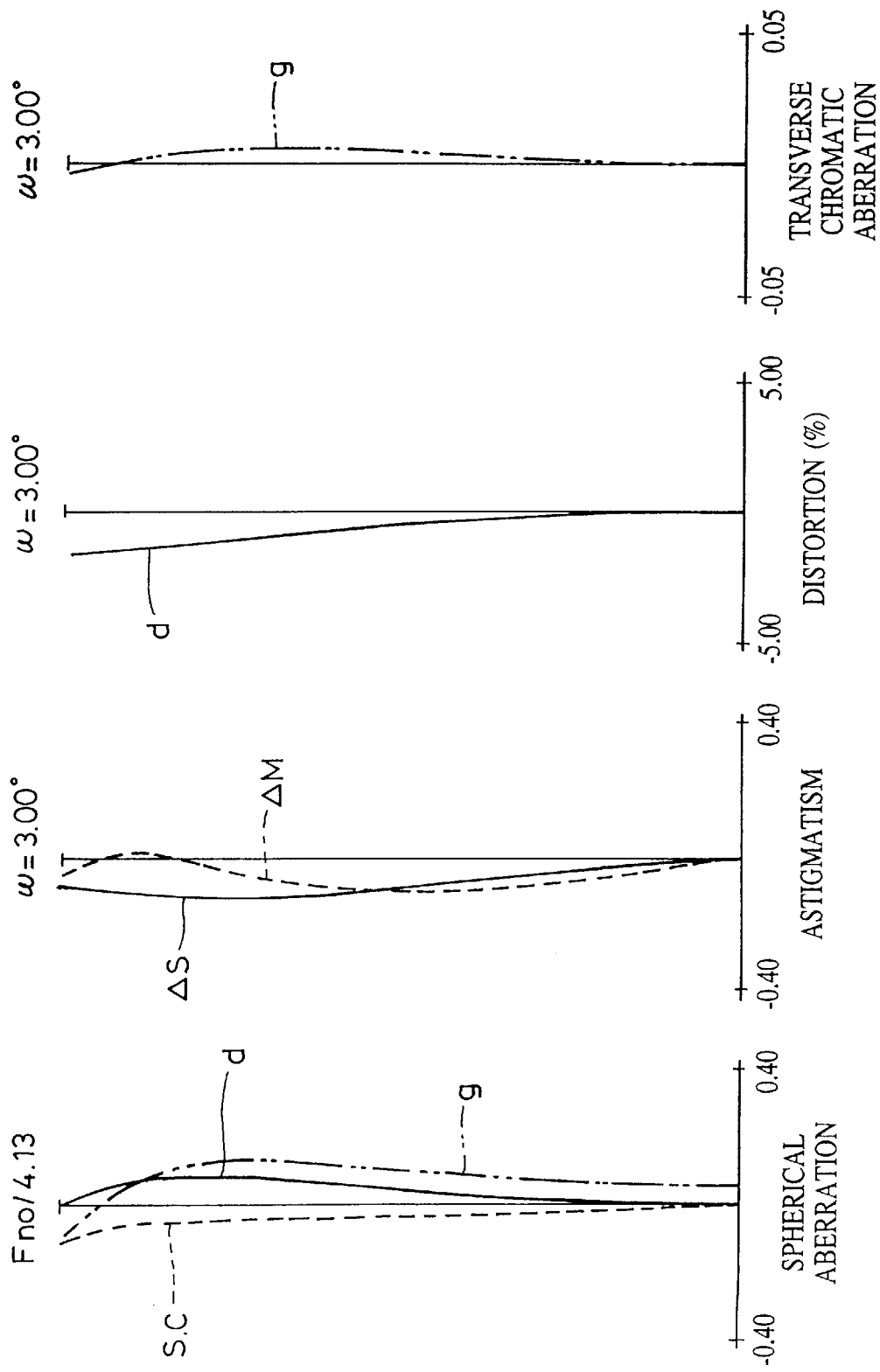

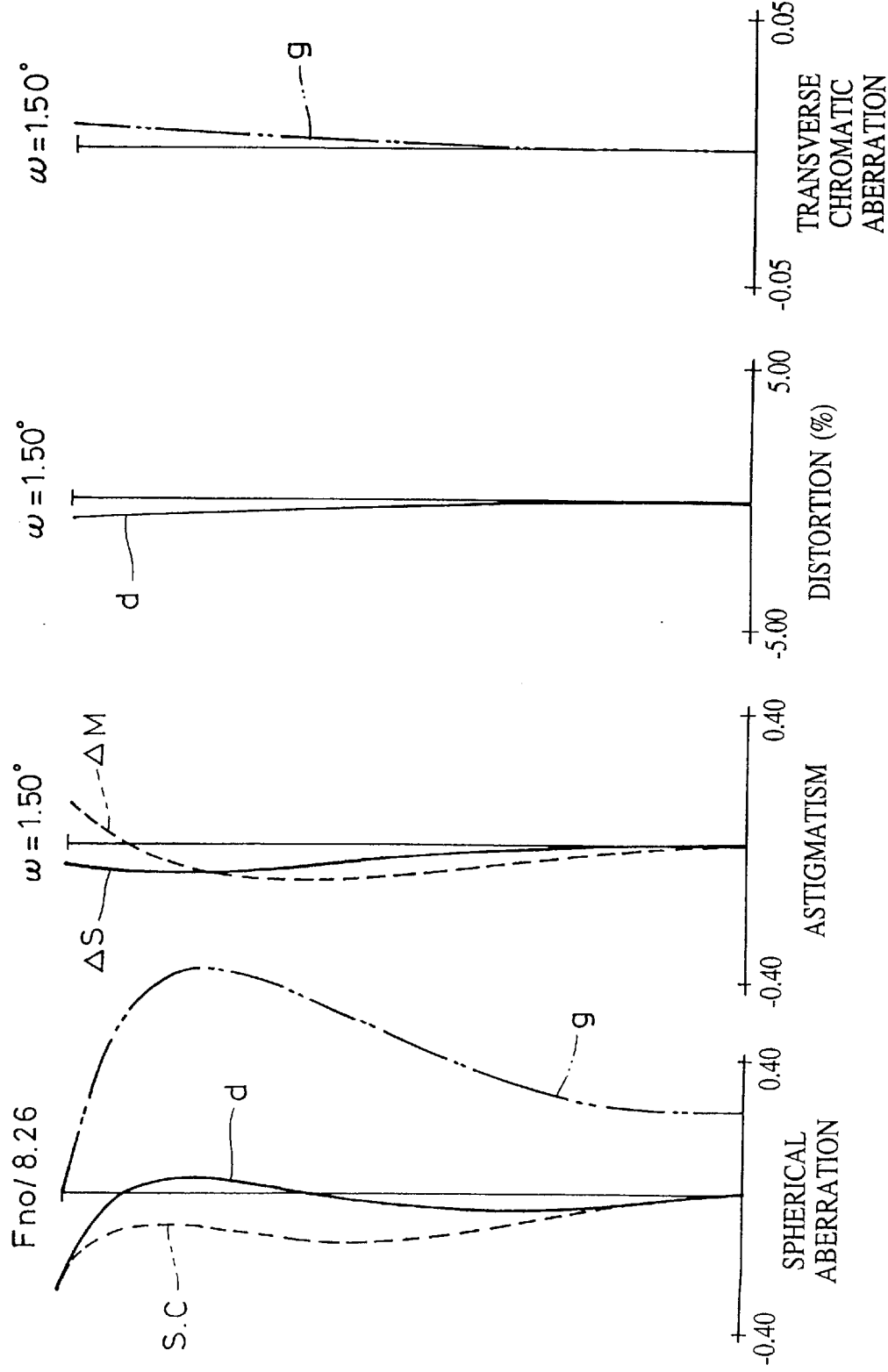

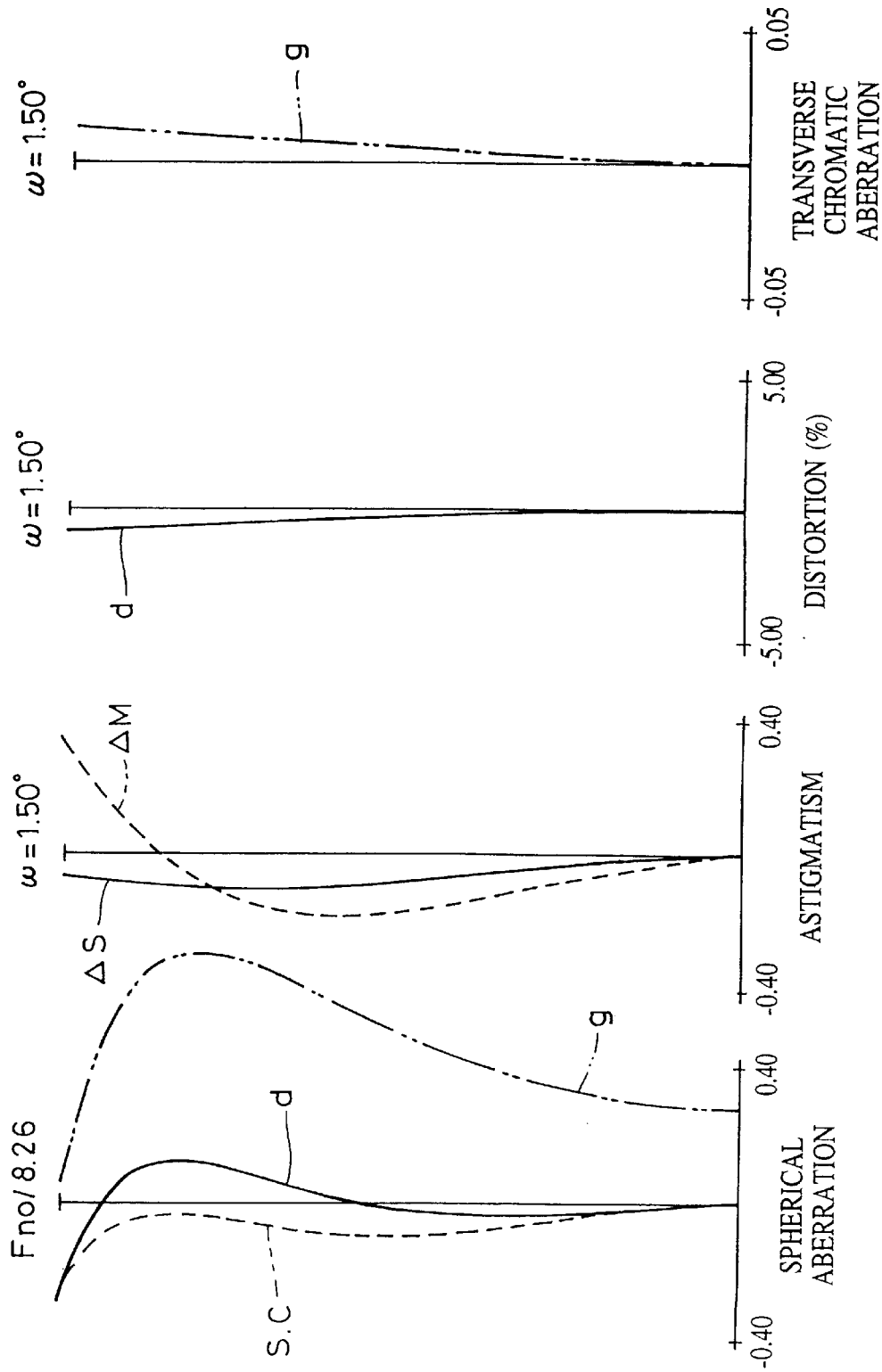

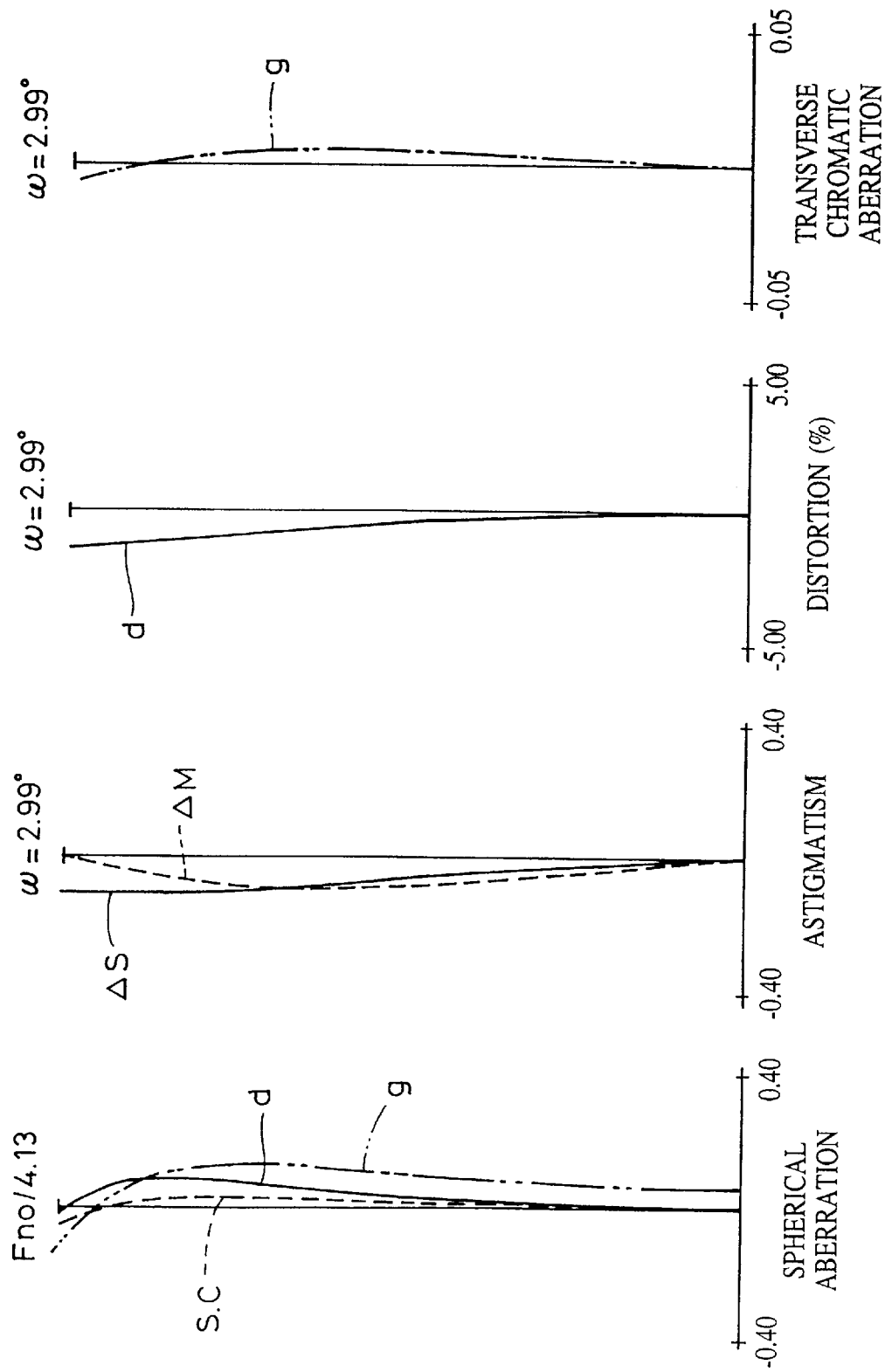

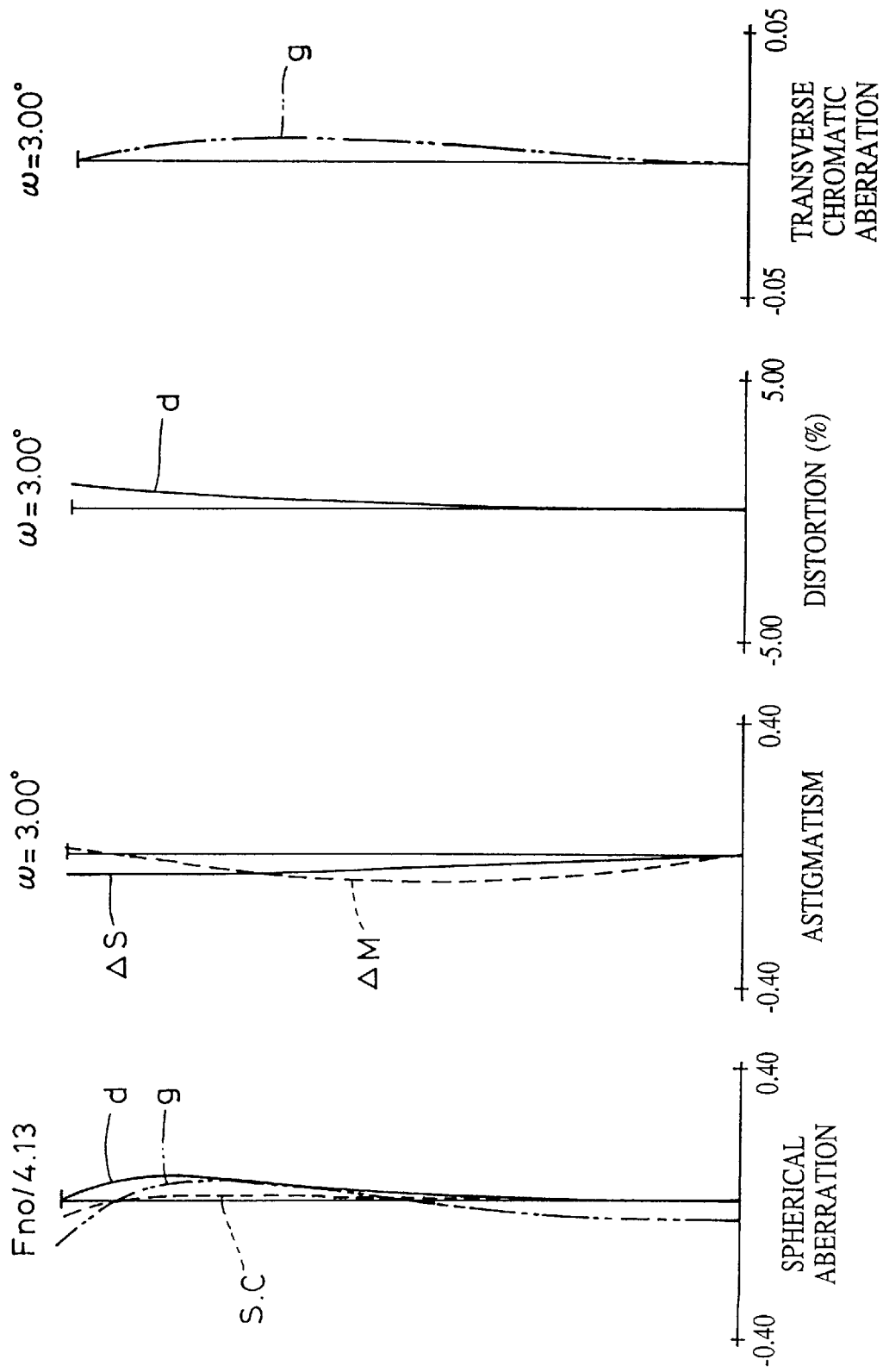

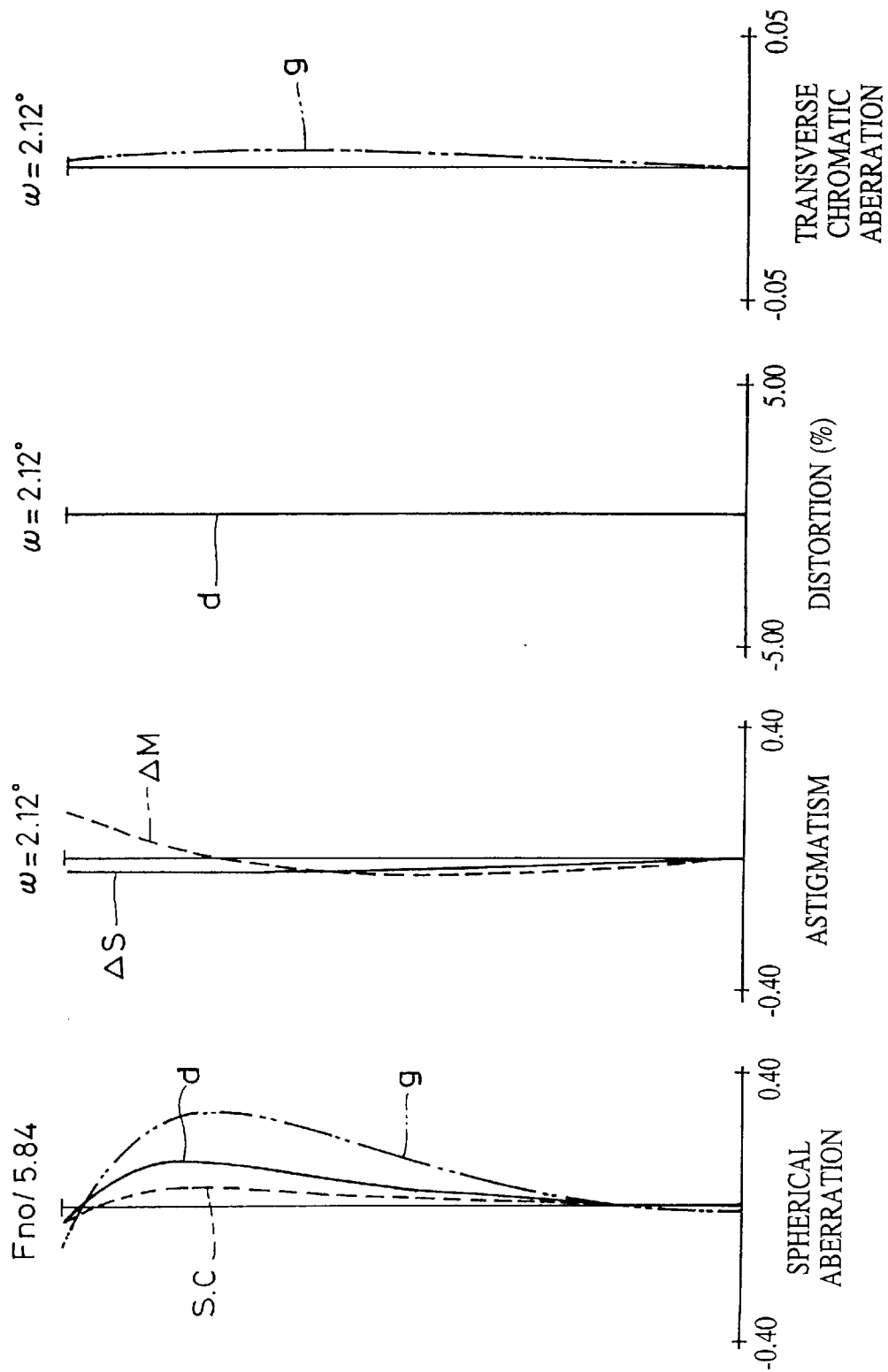

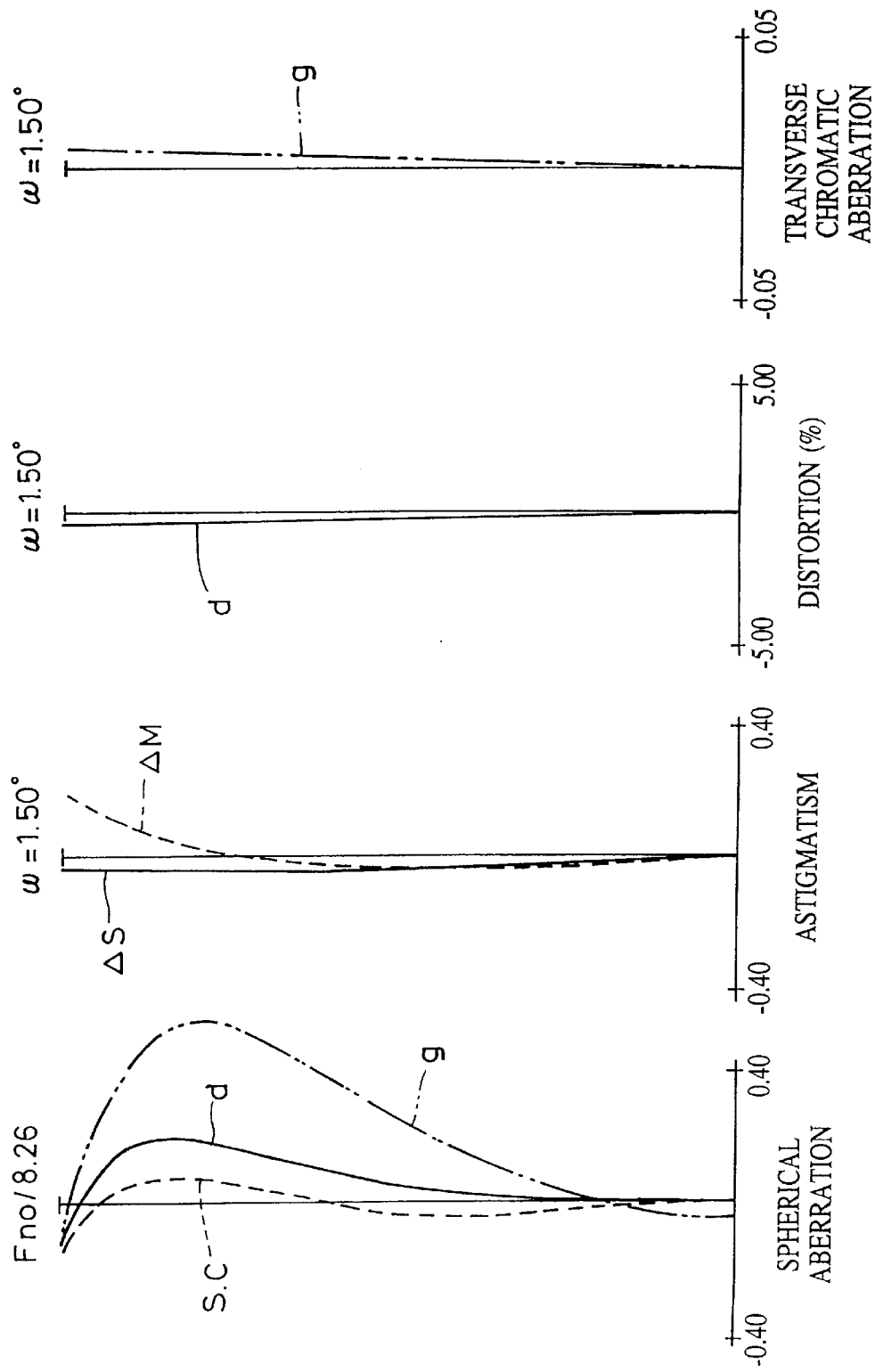

ATTACHMENT LENS HAVING DIFFRACTION SURFACE

BACKGROUND OF THE INVENTION

1. Field of the Invention

The present invention relates to an attachment lens which is ideally suited for a silver salt photographic camera, a video camera, an electronic still camera, etc., which is installed on the image surface side of a master lens serving as a photographic optical system, and which extends the focal length of the system to a longer side. The present invention also relates to a lens assembly employing the attachment lens, and a camera system equipped with the lens assembly.

2. Description of the Related Art

There have been proposed a variety of rear attachment lenses installed on the image surface side of master lenses, which serve as photographic optical systems, to extend the focal lengths of the systems toward longer focal length side.

In most rear attachment lenses designed to produce no aberration, the residual aberration of the master lens increases as the magnification increases, leading to deterioration in image quality. For example, when the magnification is ×2, the transverse aberration such as comatic aberration and lateral chromatic aberration is simply doubled, thus deteriorating image quality. Spherical aberration, curvature of field, and longitudinal aberration such as longitudinal chromatic aberration increase by the square of the magnification, that is, by four times. In the case of a rear attachment lens, since the F number of the master lens is also doubled, meaning increased darkness, the longitudinal aberration per unit focal depth is eventually doubled with resultant deterioration in image quality.

Of the residual aberrations of the master lens, the spherical aberration, the comatic aberration, the curvature of field, the longitudinal chromatic aberration, and the like could be inversely corrected by increasing the number of lens elements constituting the rear attachment lens. In principle, however, it is difficult to correct the lateral chromatic aberration due to the following reasons: the signs of the heights of the axial paraxial rays and pupil paraxial rays, which enter the rear attachment lens, from an optical axis are always the same, the rear attachment lens essentially has a relatively large negative refractive power (1/focal length) as a whole, and the Abbe numbers of existing vitric materials are all positive values.

Especially in the case of a telescopic lens assembly which frequently employs a rear attachment lens, the chromatic aberration tends to worsen as the focal length increases. When the rear attachment lens is installed, the lateral chromatic aberration, which is increased and is difficult to be corrected as mentioned above, becomes a chief cause for deteriorated image quality. No rear attachment lens with a satisfactorily corrected lateral chromatic aberration has yet been realized.

SUMMARY OF THE INVENTION

With a view toward solving the problem with the conventional art described above, the present invention has been achieved, and an object thereof is to provide an attachment lens with a satisfactorily corrected lateral chromatic aberration.

To this end, according to one aspect of the invention, there is provided an attachment lens that has a negative refraction power and includes a lens system having a diffraction surface with a negative refractive power.

According to another aspect of the invention, there is provided an attachment lens which is to be attached to a photographic lens, which has a negative refractive power, and which includes a lens system provided with a diffraction surface having a negative refractive power.

In a preferred form of the invention, the attachment lens includes a plurality of the diffraction surfaces which have the negative refractive power.

In another preferred form of the invention, the attachment lens includes a diffraction surface which has a positive refractive power.

In yet another preferred form of the invention, the diffraction surface of the attachment lens is formed on a transparent plane and/or lens.

According to another aspect of the invention, there is provided an attachment lens which is installed on the image surface side of a photographic lens, which extends the focal length of an optical system toward a longer focal length side, and which has at least one diffraction surface composed of a diffraction grating shaped so that it is rotationally symmetrical with respect to an optical axis, wherein at least one diffraction surface of the diffraction surfaces has a negative refractive power in relation to a diffracted light ray of a design order of diffraction, and at least one diffraction surface having the negative refractive power satisfies a conditional expression given below when the height of an axial paraxial ray incident upon the diffraction surface from an optical axis is denoted as $h_D$, and the height of a pupil paraxial ray incident upon the diffraction surface from the optical axis is denoted as $H_D$:

$$|h_D H_D| > h_D^2$$

According to yet another aspect of the invention, there is provided an attachment lens which is installed on the image surface side of a photographic lens, which extends the focal length of an optical system toward a longer focal length side, and which has at least one diffraction surface composed of a diffraction grating shaped so that it is rotationally symmetrical with respect to an optical axis, wherein at least one diffraction surface of the diffraction surfaces has a negative refractive power in relation to a diffracted light ray of a design order of diffraction, and at least one diffraction surface having the negative refractive power satisfies a conditional expression given below when the height of an axial paraxial ray incident upon the diffraction surface from an optical axis is denoted as $h_D$, and the height of a pupil paraxial ray incident upon the diffraction surface from the optical axis is denoted as $H_D$:

$$|h_D H_D| > h_D^2$$

and the attachment lens further satisfies a conditional expression given below when a mean refractive power of the diffraction surface having the negative refractive power is denoted as $\phi_D$, and the refractive power of a rear attachment lens obtained when the order of diffraction of the diffraction surface is selected as a design order of diffraction is denoted as $\phi_R$:

$$0.01 < \phi_D/\phi_R < 0.3$$

According to a further aspect of the invention, there is provided a lens assembly that includes one of the attachment lenses described above and a photographic lens which allows the attachment lens to be mounted on an image surface.

According to a further aspect of the invention, there is provided a camera system employing the foregoing lens assembly and a camera body.

BRIEF DESCRIPTION OF THE DRAWINGS

FIGS. 13A, 13B, 13C, and 13D are aberration diagram of the master lens.

FIGS. 15A, 15B, 15C, and 15D are aberration diagram of the second embodiment.

FIGS. 16A, 16B, 16C, and 16D are aberration diagram of the third embodiment.

FIGS. 17A, 17B, 17C, and 17D are aberration diagram of the fourth embodiment.

FIGS. 18A, 18B, 18C, and 18D are aberration diagram of the fifth embodiment.

FIGS. 19A, 19B, 19C and 19D are aberration diagram of the sixth embodiment.

FIGS. 20A, 20B, 20C and 20D are aberration diagram of the seventh embodiment.

FIGS. 21A, 21B, 21C and 21D are aberration diagram of the eighth embodiment.

FIGS. 22A, 22B, 22C, and 22D are aberration diagram of the ninth embodiment.

FIGS. 23A, 23B, 23C and 23D are aberration diagram of the tenth embodiment.

DESCRIPTION OF THE PREFERRED EMBODIMENT

The embodiments of the present invention will now be described in conjunction with the accompanying drawings.

Figure 1:
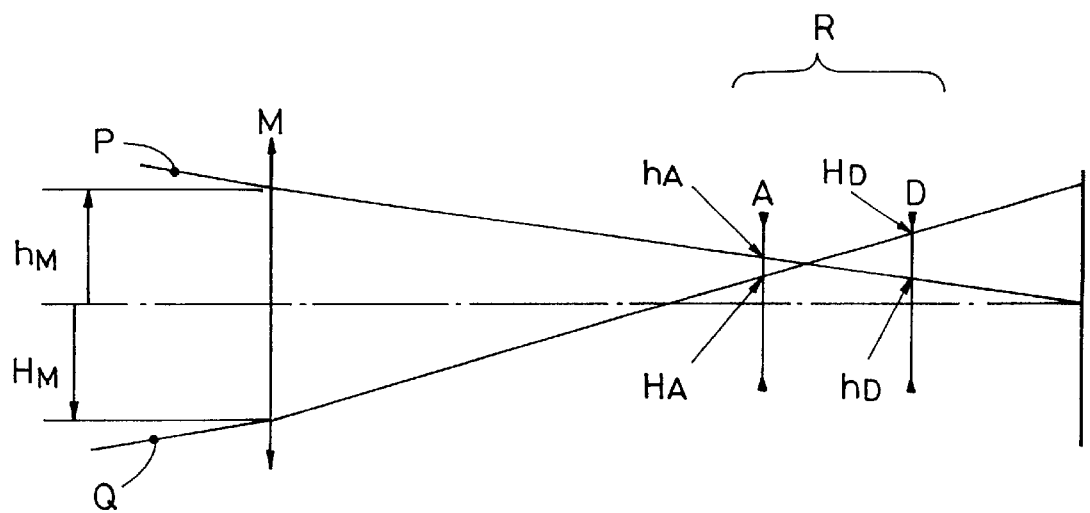
FIG. 1 is a schematic diagram showing a paraxial layout for illustrating an operation.

FIG. 1 is a schematic diagram showing a paraxial layout for illustrating an operation of the present invention. In the drawing, M denotes a master lens assembly, which is a replaceable photographic lens, R denotes a rear attachment lens, A denotes a refraction optical system of the rear attachment lens, D denotes a diffraction surface of the rear attachment lens, P denotes a paraxial axial ray, and Q denotes a pupil paraxial axial ray. For the purpose of simplicity, it is assumed that diffraction surface D is located on the image surface side of refraction optical system A, and master lens M and refraction optical system A, respectively, are thin, single lenses. Rear attachment lens R is installed on the image surface side of master lens M and is attached to a mount of a camera main body.

First, a case will be considered where the rear attachment lens does not have diffraction surface D. Regarding master lens M and refraction optical system A of the rear attachment lens, longitudinal chromatic aberration coefficient L and lateral chromatic aberration coefficient T are given by the following formulas:

$$L = h_M^2 \phi_M / \nu_M + h_A^2 \phi_A / \nu_A \qquad (1)$$

$$T = h_M H_M \phi_M / \nu_M + h_A H_A \phi_A / \nu_A \qquad (2)$$

where $\phi_M$: Refractive power of master lens M $\phi_A$: Refractive power of refraction optical system A $\nu_M$: Abbe number of master lens M $\nu_A$: Abbe number of refraction optical system A $h_M$: Height of paraxial axial ray P incident upon master lens M $h_A$: Height of paraxial axial ray P incident upon refraction optical system A $H_M$: Height of pupil paraxial ray Q incident upon main lens M $H_A$: Height of pupil paraxial ray Q incident upon refraction optical system A From formula (1), longitudinal chromatic aberration coefficient L of master lens M in the first term is determined as follows:

$\phi_M > 0$, $\nu_M > 0$; therefore, $h_M^2 \phi_M / \nu_M > 0$.

Further, longitudinal chromatic aberration coefficient L of refraction optical system A in the second term is determined as follows:

$\phi_A < 0$, $\nu_A > 0$; therefore, $h_A^2 \phi_A / \nu_A < 0$.

Thus, regarding the longitudinal chromatic aberration, it is possible to reduce the longitudinal chromatic aberration coefficient L of the whole system by canceling the longitudinal chromatic aberration coefficient of master lens M by the longitudinal chromatic aberration coefficient of refraction optical system A.

From formula (2), the lateral chromatic aberration coefficient of master lens M in the first term is determined as follows:

$h_M>0$, $H_M<0$, $\phi_M>0$, $\nu_M>0$; therefore, $h_M H_M \phi_M/\nu_M<0$.

Further, the lateral chromatic aberration coefficient of refraction optical system A in the second term is determined as follows:

$h_A>0$, $H_A>0$, $\phi_A<0$, $\nu_A>0$; therefore, $h_A H_A \phi_A/\nu_A<0$.

Regarding the lateral chromatic aberration, it is impossible to reduce lateral chromatic aberration coefficient T of the whole system by canceling the lateral chromatic aberration coefficient of master lens M by the lateral chromatic aberration coefficient of refraction optical system A.

In actual applications, master lens M and refraction optical system A are formed of a plurality of lens surfaces, namely, m surfaces and n surfaces. Hence, the values of the terms of formula (1) and formula (2) become the sums of the aberration coefficients for each type of surfaces; more detailedly, they may be expressed as shown below:

$$L = \sum_{i=1}^{m} h_{Mi}^2 \phi_{Mi}/\nu_{Mi} + \sum_{j=1}^{n} h_{Aj}^2 \phi_{Aj}/\nu_{Aj} \quad (3)$$

$$T = \sum_{i=1}^{m} h_{Mi} H_{Mi} \phi_{Mi}/\nu_{Mi} + \sum_{j=1}^{n} h_{Aj} H_{Aj} \phi_{Aj}/\nu_{Aj} \quad (4)$$

First, since master lens M, as a whole, essentially has a positive refractive power, the signs of the values of the first terms in formulas (3) and (4) related to master lens M will be mostly the same as those in the case of a single-lens model. Likewise, since the rear attachment lens, as a whole, essentially has a negative refractive power, the signs of the values of the second terms in formulas (3) and (4) related to refraction optical system A will be also mostly the same as those in the case of a single-lens model. Hence, there should be no problem in using the foregoing single-lens model for the discussion.

A case where the rear attachment lens has diffraction surface D will now be discussed. In a similar manner, longitudinal chromatic aberration coefficient L and lateral chromatic aberration coefficient T on master lens M, refraction optical system A, and diffraction surface D will be determined by the following formulas:

$$L = h_M^2 \phi_M/\nu_M + h_A^2 \phi_A/\nu_A + h_D^2 \phi_D/\nu_D \quad (5)$$

$$L = h_M H_M \phi_M/\nu_M + h_A H_A \phi_A/\nu_A + h_D H_D \phi_D/\nu_D \quad (6)$$

where the variables other than those employed in formulas (1) and (2) are defined as follows:

$\phi_D$: Refractive power of the diffracted light ray of design order of diffraction surface D $\nu_D$: Conversional Abbe number of diffraction surface D (equivalent to −3.45)

$h_D$: Height of paraxial axial ray P incident upon diffraction surface D $H_D$: Height of pupil paraxial ray Q incident upon diffraction surface D First, attention will be paid to the third term of formula (6). As shown in FIG. 1, when diffraction surface D is positioned relatively behind refraction optical system A such that height $h_D$ is not excessively small and height $H_D$ is relatively large, with the refractive power of diffraction surface D being set to $\phi_D<0$, the third term in formula (6) will be as shown below:

$h_D>0$, $H_D>0$, $\nu_D<0$; therefore, $h_D H_D \phi_D/\nu_D>0$.

Thus, lateral chromatic aberration coefficient T (a negative value) of master lens M and refraction optical system A can be canceled by diffraction surface D.

At this time, the value of the third term in formula (5) will be also a positive value, and aberration coefficient L, which is a positive axial chromatic value of master lens M and refraction optical system A, cannot be cancelled, leading to an increase in longitudinal chromatic aberration coefficient L of the whole system. As it can be seen from FIG. 1, however, the influences of diffraction surface D on longitudinal chromatic aberration coefficient L or the increase in longitudinal chromatic aberration coefficient L of the entire system will be relatively less as shown below:

$h_M>h_A>h_D$; therefore, $h_M^2 >> h_A^2 >> h_D^2$.

This means that diffraction surface D must be positioned to satisfy at least the following condition:

$$|h_D H_D|>h_D^2 \quad (7)$$

The F number of master lens M is increased in proportion to the magnification of the rear attachment lens. For this reason, the increase in the longitudinal chromatic aberration per unit focal depth of diffraction surface D is eased, and it can be eventually regarded that diffraction surface D hardly influences the longitudinal chromatic aberration.

Hence, the lateral chromatic aberration, which is primarily responsible for the deterioration in image quality, can be successfully corrected while hardly affecting the longitudinal chromatic aberration by providing diffraction surface D with a negative refractive power against a diffracted light ray of a design order of diffraction and by properly locating it so as to satisfy conditional expression (7).

Further preferably, conditional expression (7) should have the following range of values in order to provide better balance between the lateral chromatic aberration and the longitudinal chromatic aberration:

$$|h_D H_D|/h_D^2 > 2 \quad (h_D \neq 0) \quad (8)$$

To accomplish even better balance between the lateral chromatic aberration and the longitudinal chromatic aberration, the following conditional expression should be satisfied when the mean refractive power of a diffraction surface that has a negative refractive power against a diffracted light ray of a design order of diffraction (e.g. a first-order diffracted light) is denoted as $\phi_D$, and the refractive power of refraction optical system A obtained when the order of diffraction of the diffraction surface is set to the design order of diffraction is denoted as $\phi_R$:

$$0.01 < \phi_D/\phi_R < 0.3 \quad (9)$$

Conditional expression (9) indicates the condition related to the ratio of the mean refractive power of the diffraction surface that has the negative refractive power against the diffracted light ray of the design order of diffraction to the refractive power of the rear attachment lens obtained when the order of diffraction of the diffraction surface is set to the design order of diffraction; it shows the condition for achieving good balance between the lateral chromatic aberration and the longitudinal chromatic aberration.

If the mean refractive power of the diffraction surface having the negative refractive power exceeds an upper limit value of conditional expression (9), then the lateral chromatic aberration will be overcorrected and the longitudinal chromatic aberration will be also overcorrected. This is also undesirable from the standpoint of manufacture because the grating pitches of each diffraction surface will be smaller. On the other hand, if the mean refractive power of the diffraction surface having the negative refractive power is too small, exceeding a lower limit value, then the lateral chromatic aberration cannot be satisfactorily corrected although the overcorrection of the longitudinal chromatic aberration is suppressed.

Further preferably, conditional expression (9) should have the following range of values in order to provide even better balance between the lateral chromatic aberration and the longitudinal chromatic aberration:

$$0.03 < \phi_D/\phi_R < 0.2 \tag{10}$$

Phase configuration $\phi$ of the diffraction surface of each embodiment is represented by an expression given below:

$$\phi(h,m) = (2\pi/m\lambda_0)(C_1 h^2 + C_2 h^4 + C_3 h^6 \ldots)$$

where h: Height in perpendicular direction with respect to optical axis m: Order of diffraction of a diffracted light ray $\lambda_0$: Design wavelength $C_i$: Phase coefficient (i=1, 2, 3 . . . )

At this time, refractive power $\phi$ of the diffraction surface for arbitrary wavelength $\lambda$ and arbitrary order of diffraction m can be expressed as follows by using phase coefficient $C_1$:

$$\phi(\lambda,m) = -2C_1 m\lambda/\lambda_0$$

Figure 2:
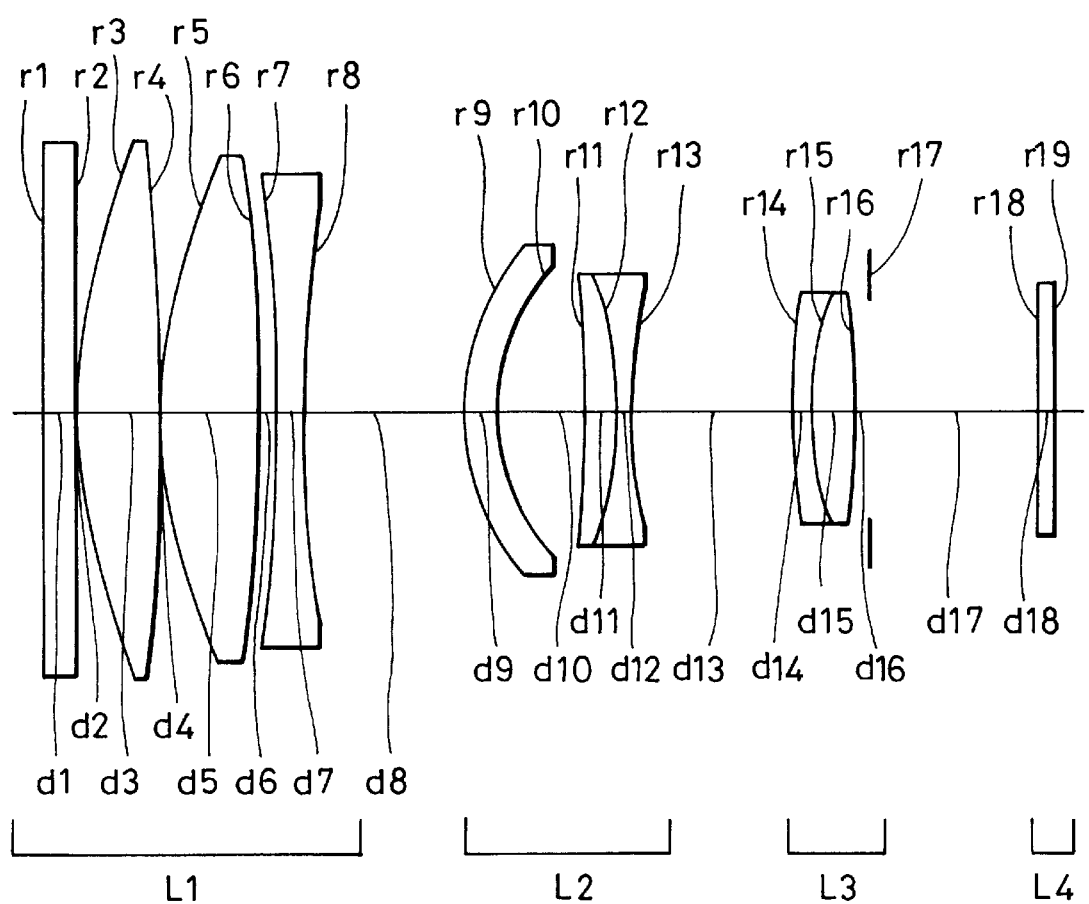
FIG. 2 is a sectional view of a master lens.
Figure 3:
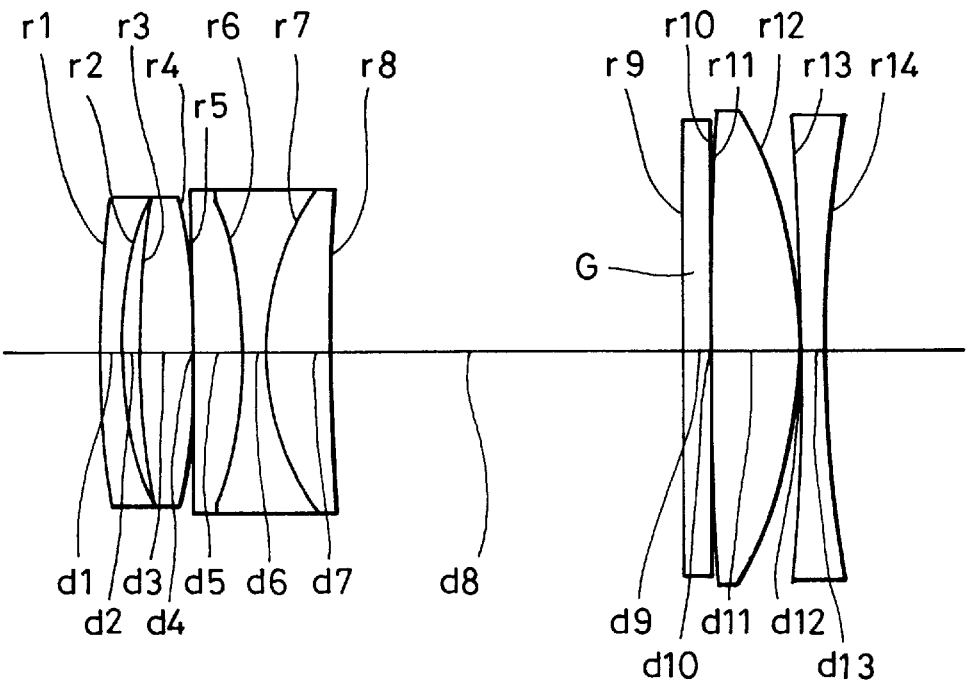
FIG. 3 is a sectional view of a lens in accordance with a first embodiment.
Figure 4:
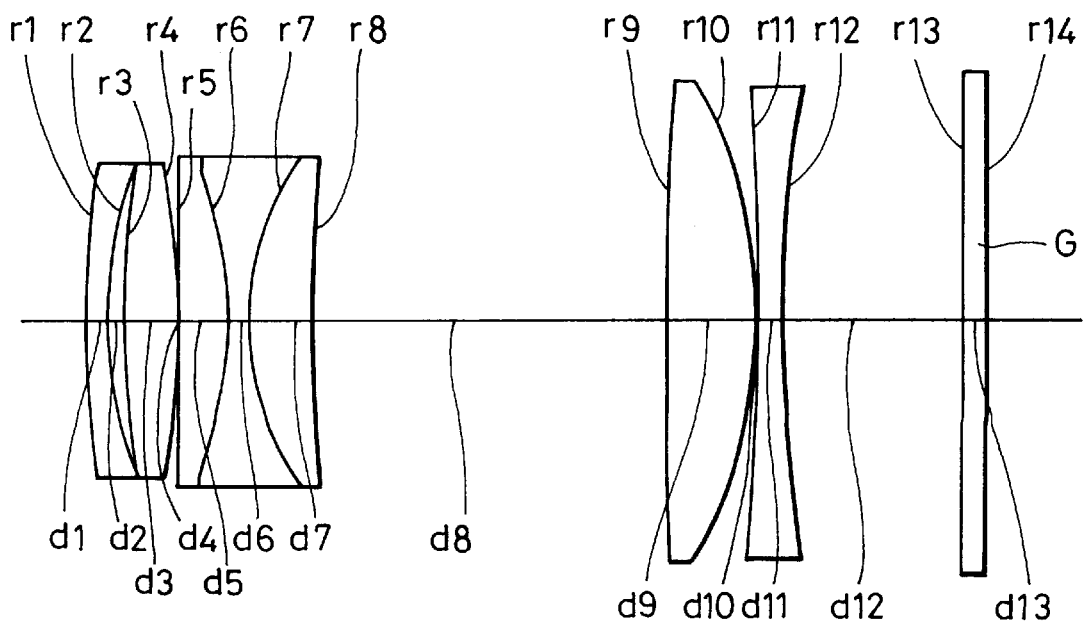
FIG. 4 is a sectional view of a lens in accordance with a second embodiment.
Figure 5:
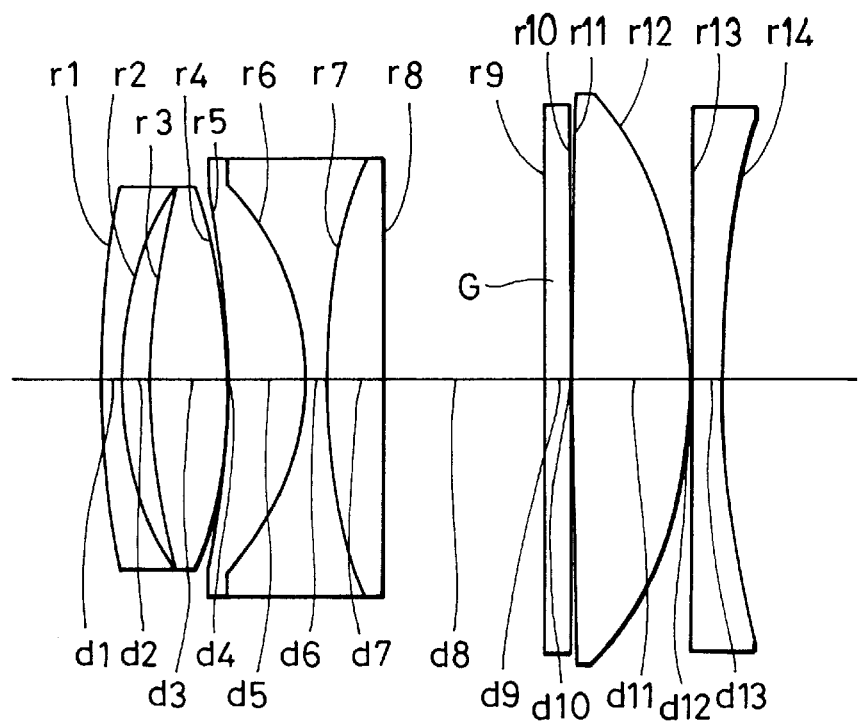
FIG. 5 is a sectional view of a lens in accordance with a third embodiment.
Figure 6:
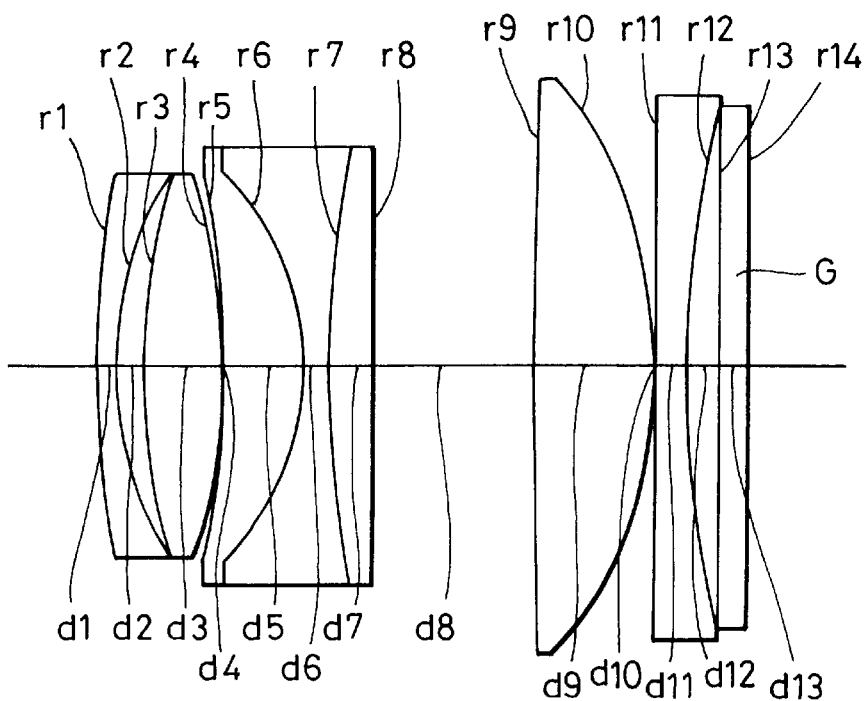
FIG. 6 is a sectional view of a lens in accordance with a fourth embodiment.
Figure 7:
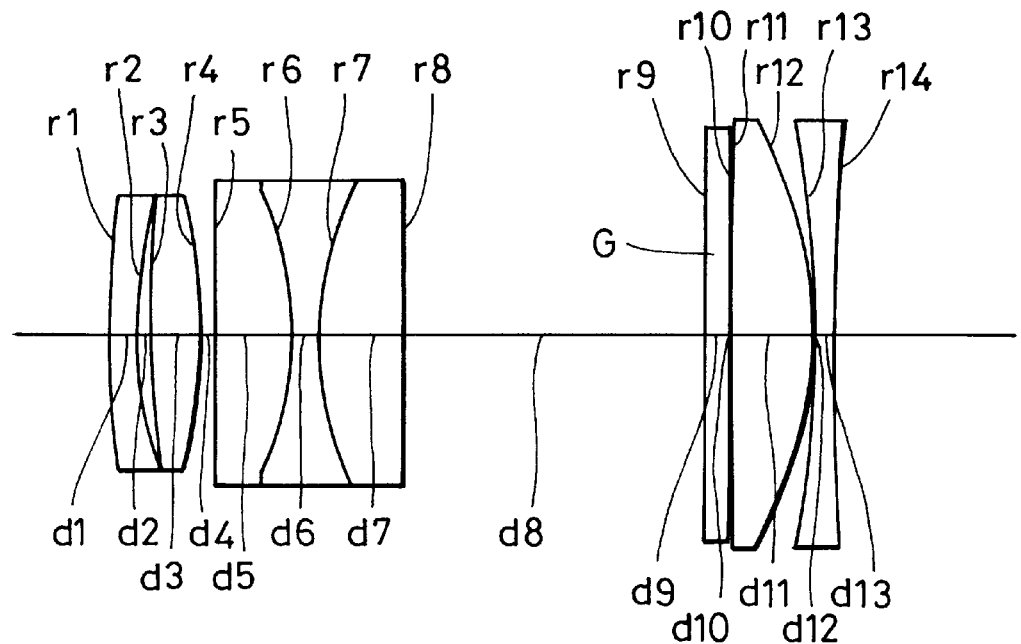
FIG. 7 is a sectional view of a lens in accordance with a fifth embodiment.
Figure 8:
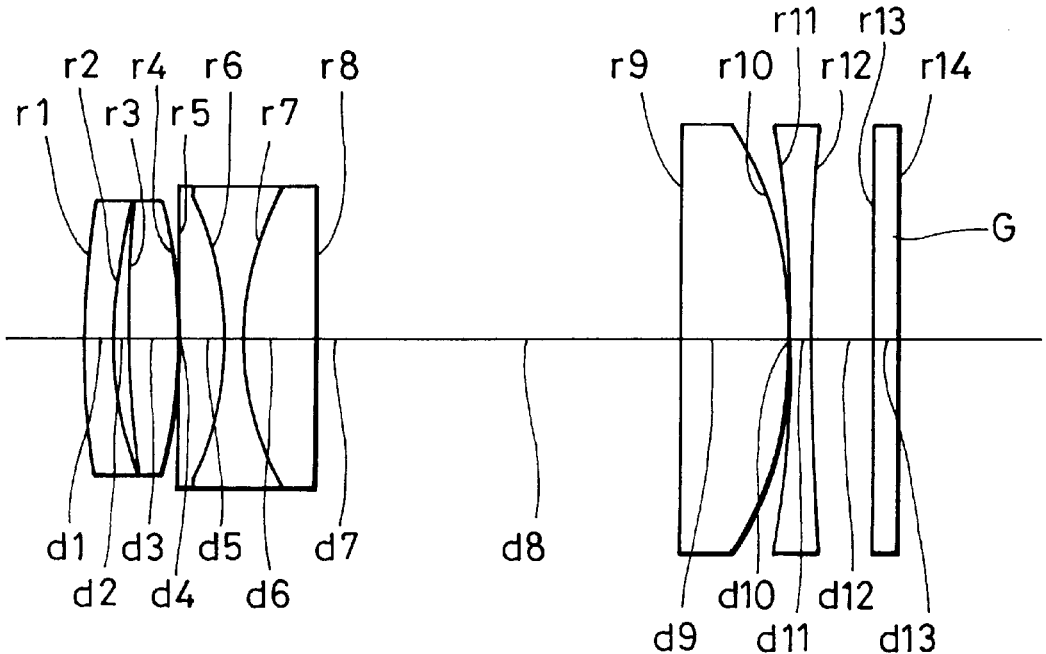
FIG. 8 is a sectional view of a lens in accordance with a sixth embodiment.
Figure 9:
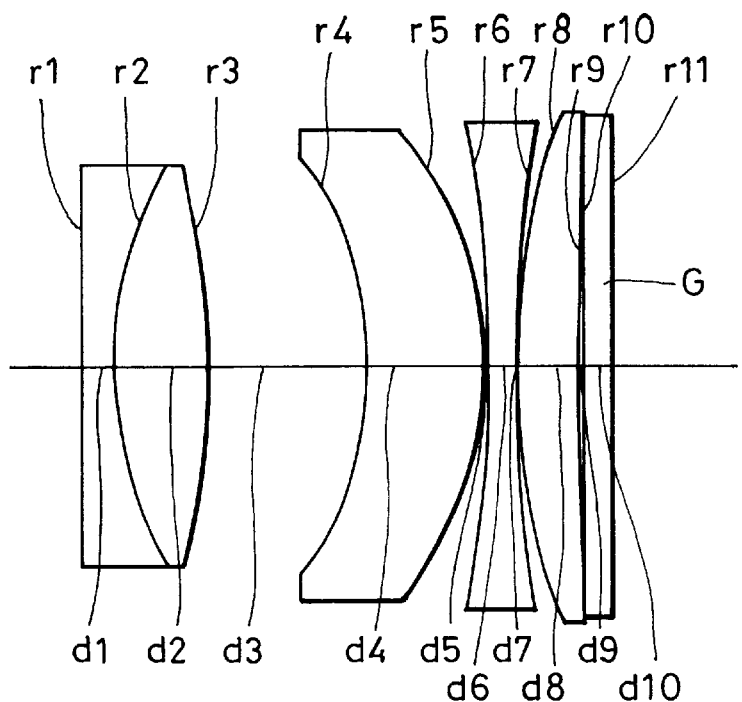
FIG. 9 is a sectional view of a lens in accordance with a seventh embodiment.
Figure 10:
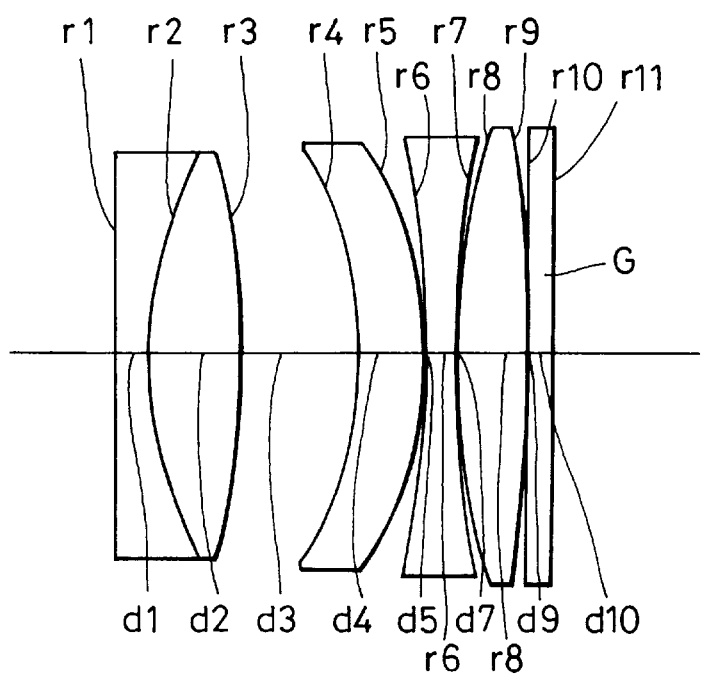
FIG. 10 is a sectional view of a lens in accordance with an eighth embodiment.
Figure 11:
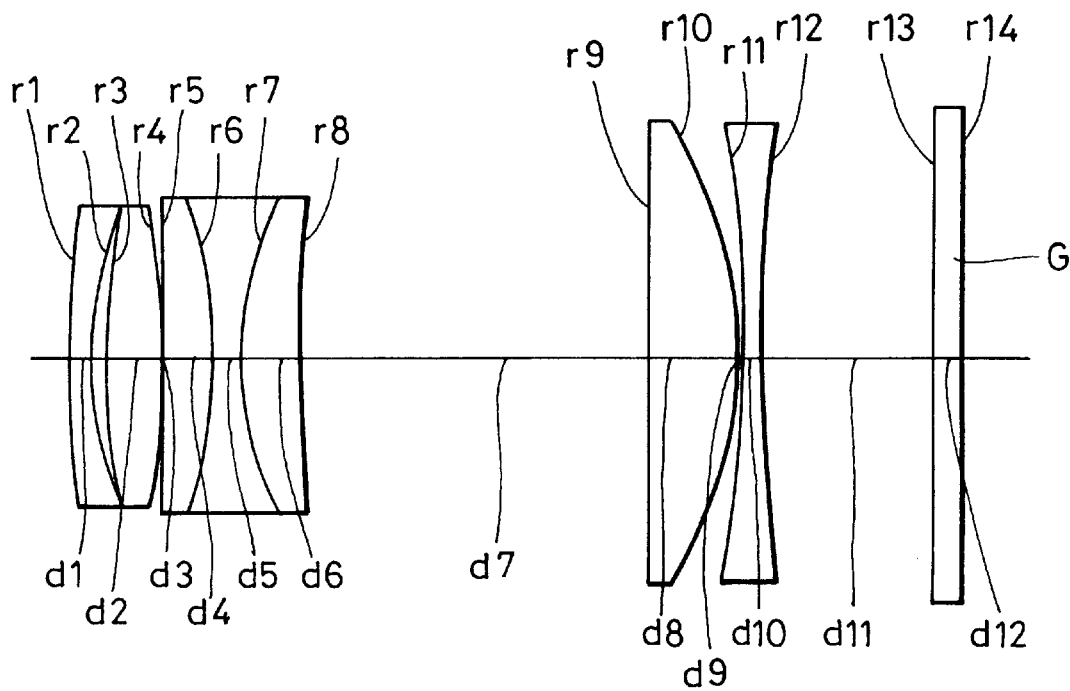
FIG. 11 is a sectional view of a lens in accordance with a ninth embodiment.
Figure 12:
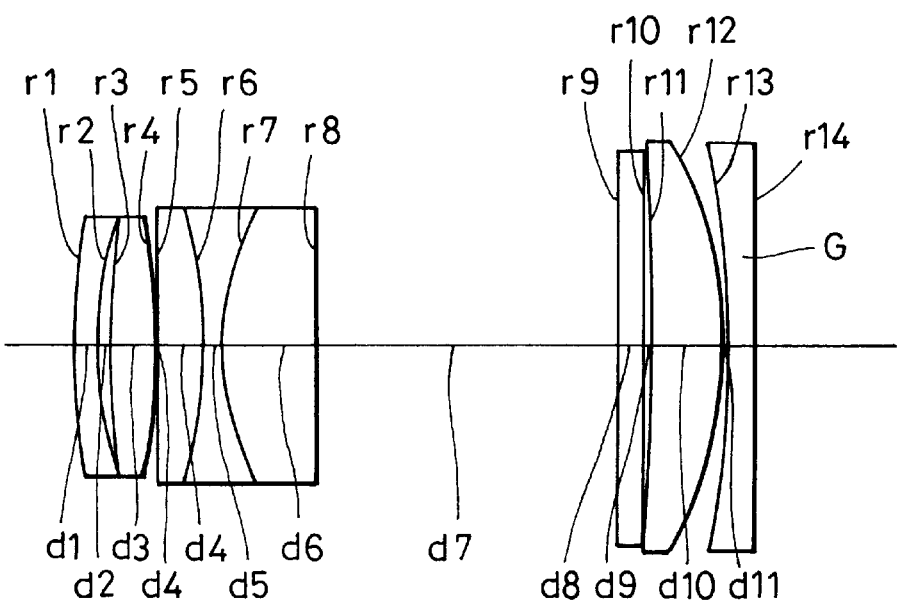
FIG. 12 is a sectional view of a lens in accordance with a tenth embodiment.
Figures 14A, 14B, 14C, 14D:
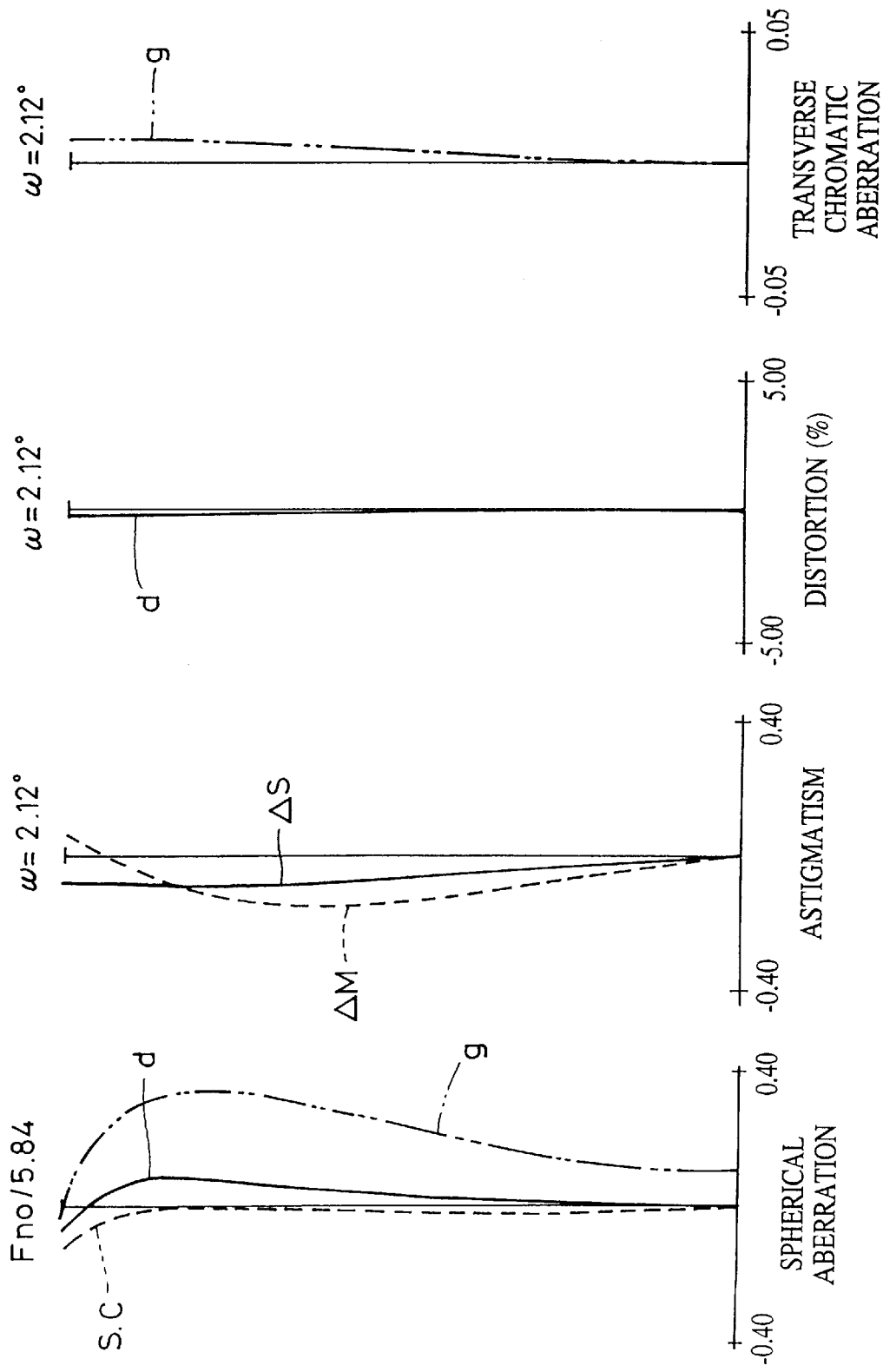
FIGS. 14A, 14B, 14C, and 14D are aberration diagram of the first embodiment.

FIG. 2 is a sectional view of master lens M. Master lens M is comprised of a first lens group L1 having a positive refractive power, a second lens group L2 that is composed of cemented positive and negative lenses, and a third lens group L3 having a positive refractive power in this order from the object side. The second lens group L2 is moved toward an image surface on an optical axis to effect focusing from infinity to short distance. Both the lateral chromatic aberration and the longitudinal chromatic aberration can be satisfactorily corrected at the same time as the entire master lens M by providing a parallel protective glass plane L4 located, for example, at a position closer to the image surface of master lens M as shown in FIG. 2 with a diffraction surface having a positive refractive power against a diffracted light ray of a design order of diffraction. Especially when a rear attachment lens with high magnification is used, master lens M should be also provided with the diffraction surface so as to ensure better optical performance.

FIG. 3 through FIG. 12 are the lens sectional views of first through tenth embodiments of the present invention. In all embodiments, the diffraction surfaces are provided on parallel glass planes G. In the eighth through tenth embodiments, the diffraction surfaces are provided on lens surfaces in addition to the glass planes G. Order of diffraction m of a diffracted light ray is 1, and design wavelength $\lambda_0$ indicates the wavelength (587.56 nm) of line d. More diffraction surfaces may be added to provide better optical performance. Each diffraction surface is provided on one surface of glass plane G serving as a base; however, the diffraction surfaces may be provided on both surfaces of glass plane G. As an alternative, a spherical lens or aspherical lens may be used as the base, or the diffraction surface may be provided on a cemented surface of a cemented lens assembly. The constituent of the base may not necessarily be glass as long as it transmits light.

The rear attachment lens may be equipped with a diffraction surface having a positive refractive power in addition to the diffraction surface having a negative refractive power against a diffracted light ray of a design order. In this case, the longitudinal chromatic aberration can be also improved by positioning the diffraction surface on the main lens M side of the rear attachment lens where the incident height of a paraxial axial ray is relatively large and the incident height of a pupil paraxial ray is relatively small.

The numerical examples of master lens M and the first through tenth embodiments will now be shown, wherein ri indicates the curvature radius of an i-th surface counted from the object side, di indicates an axial surface interval of an i-th reference state counted from the object side, ni and vi indicate the refractive power and the Abbe number, respectively, for line d of an i-th lens counted from the object side. Further, f indicates a focal length, fno indicates an F number, and $2\omega$ indicates a field angle.

In the numerical examples of the first through tenth embodiments, the axial spatial interval between the last surface of master lens M and a first surface r1 of the rear attachment lens is 28.41.

Numerical Embodiment of Master Lens
f = 293.27    fno = 1:2.93    2ω = 8.44°

| | | | | | | | |
|---|---|---|---|---|---|---|---|
| r1 = | 0.000 | d1 = | 6.00 | n1 = | 1.51633 | v1 = | 64.2 |
| r2 = | 0.000 | d2 = | 1.00 | | | | |
| r3 = | 131.303 | d3 = | 15.50 | n2 = | 1.43387 | v2 = | 95.1 |
| r4 = | −472.659 | d4 = | 0.69 | | | | |
| r5 = | 109.103 | d5 = | 18.23 | n3 = | 1.49700 | v3 = | 81.6 |
| r6 = | −450.650 | d6 = | 3.45 | | | | |
| r7 = | −345.086 | d7 = | 5.55 | n4 = | 1.72047 | v4 = | 34.7 |
| r8 = | 274.876 | d8 = | 31.30 | | | | |
| r9 = | 47.161 | d9 = | 6.10 | n5 = | 1.58913 | v5 = | 61.2 |
| r10 = | 41.324 | d10 = | 17.08 | | | | |
| r11 = | −214.529 | d11 = | 6.00 | n6 = | 1.80518 | v6 = | 25.4 |
| r12 = | −72.608 | d12 = | 2.50 | n7 = | 1.61340 | v7 = | 43.8 |
| r13 = | 84.898 | d13 = | 33.20 | | | | |
| r14 = | 172.436 | d14 = | 2.50 | n8 = | 1.69680 | v8 = | 55.5 |
| r15 = | 55.380 | d15 = | 8.00 | n9 = | 1.61800 | v9 = | 63.4 |
| r16 = | −280.316 | d16 = | 3.00 | | | | |
| r17 = | 0.000 | d17 = | 33.50 | | | | |
| | (stop) | | | | | | |
| r18 = | 0.000 | d18 = | 2.00 | n10 = | 1.51633 | v10 = | 64.2 |
| r19 = | 0.000 | | | | | | |

Numerical Embodiment 1
f = −94.66399    Magnification 1.993

| | | | | | | | |
|---|---|---|---|---|---|---|---|
| r1 = | 78.066 | d1 = | 1.50 | n1 = | 1.87974 | v1 = | 36.8 |
| r2 = | 28.636 | d2 = | 1.09 | | | | |
| r3 = | 54.355 | d3 = | 3.80 | n2 = | 1.58797 | v2 = | 38.5 |
| r4 = | −71.491 | d4 = | 0.15 | | | | |
| r5 = | 771.199 | d5 = | 3.70 | n3 = | 1.76062 | v3 = | 50.9 |
| r6 = | −30.765 | d6 = | 1.60 | n4 = | 1.88370 | v4 = | 39.9 |
| r7 = | 20.799 | d7 = | 4.50 | n5 = | 1.80986 | v5 = | 24.1 |
| r8 = | 136.593 | d8 = | 25.31 | | | | |
| r9 = | 0.000 | d9 = | 2.00 | n6 = | 1.45867 | v6 = | 67.9 |
| r10 = | 0.000 | d10 = | 0.15 | | | | |
| | | (Diffraction surface) | | | | | |
| r11 = | 437.042 | d11 = | 6.18 | n7 = | 1.48700 | v7 = | 70.4 |
| r12 = | −32.736 | d12 = | 0.15 | | | | |
| r13 = | −205.829 | d13 = | 1.80 | n8 = | 1.86567 | v8 = | 28.8 |
| r14 = | 89.095 | | | | | | |

-continued

Phase Coefficient of Diffraction Surface $C_1 = 2.9560 \cdot 10^{-4}$   $C_2 = -6.3586 \cdot 10^{-7}$   $C_3 = 8.3259 \cdot 10^{-10}$

Numerical Embodiment 2
f = −90.25563   Magnification 1.993

| | | | | | | | |
|---|---|---|---|---|---|---|---|
| r1 = | 75.896 | d1 = | 1.50 | n1 = | 1.88002 | ν1 = | 37.0 |
| r2 = | 26.975 | d2 = | 1.05 | | | | |
| r3 = | 46.617 | d3 = | 3.80 | n2 = | 1.58215 | ν2 = | 39.4 |
| r4 = | −60.429 | d4 = | 0.15 | | | | |
| r5 = | −240.061 | d5 = | 3.70 | n3 = | 1.75925 | ν3 = | 50.9 |
| r6 = | −29.491 | d6 = | 1.60 | n4 = | 1.88358 | ν4 = | 39.8 |
| r7 = | 22.524 | d7 = | 4.50 | n5 = | 1.82662 | ν5 = | 23.6 |
| r8 = | 247.348 | d8 = | 25.39 | | | | |
| r9 = | −2009.873 | d9 = | 5.83 | n6 = | 1.48812 | ν6 = | 70.3 |
| r10 = | −31.436 | d10 = | 0.15 | | | | |
| r11 = | −225.016 | d11 = | 1.80 | n7 = | 1.85966 | ν7 = | 26.3 |
| r12 = | 85.044 | d12 = | 13.11 | | | | |
| r13 = | 0.000 | d13 = | 2.00 | n8 = | 1.45867 | ν8 = | 67.9 |

(Diffraction surface)

r14 = 0.000

Phase Coefficient of Diffraction Surface $C_1 = 3.6764 \cdot 10^{-4}$   $C_2 = -4.4630 \cdot 10^{-7}$   $C_3 = 4.3342 \cdot 10^{-10}$

Numerical Embodiment 3
f = −260.98438   Magnification 1.409

| | | | | | | | |
|---|---|---|---|---|---|---|---|
| r1 = | 62.482 | d1 = | 1.50 | n1 = | 1.73068 | ν1 = | 52.3 |
| r2 = | 23.820 | d2 = | 2.21 | | | | |
| r3 = | 50.267 | d3 = | 5.38 | n2 = | 1.61100 | ν2 = | 36.9 |
| r4 = | −45.042 | d4 = | 0.22 | | | | |
| r5 = | −69.525 | d5 = | 5.29 | n3 = | 1.67389 | ν3 = | 31.7 |
| r6 = | −20.993 | d6 = | 1.50 | n4 = | 1.80902 | ν4 = | 34.3 |
| r7 = | 41.516 | d7 = | 4.29 | n5 = | 1.82607 | ν5 = | 24.1 |
| r8 = | 585.117 | d8 = | 11.87 | | | | |
| r9 = | 0.000 | d9 = | 2.00 | n6 = | 1.45867 | ν6 = | 67.9 |
| r10 = | 0.000 | d10 = | 0.15 | | | | |

(Diffraction surface)

| | | | | | | | |
|---|---|---|---|---|---|---|---|
| r11 = | 717.517 | d11 = | 8.83 | n7 = | 1.57813 | ν7 = | 62.7 |
| r12 = | −31.202 | d12 = | 0.15 | | | | |
| r13 = | −379.645 | d13 = | 1.80 | n8 = | 1.85000 | ν8 = | 23.0 |
| r14 = | 70.721 | | | | | | |

Phase Coefficient of Diffraction Surface $C_1 = 1.8716 \cdot 10^{-4}$   $C_2 = -3.0730 \cdot 10^{-7}$   $C_3 = 8.4002 \cdot 10^{-11}$

Numerical Embodiment 4
f = −305.32486   Magnification 1.410

| | | | | | | | |
|---|---|---|---|---|---|---|---|
| r1 = | 64.182 | d1 = | 1.50 | n1 = | 1.78216 | ν1 = | 49.7 |
| r2 = | 23.316 | d2 = | 2.18 | | | | |
| r3 = | 47.006 | d3 = | 5.60 | n2 = | 1.63244 | ν2 = | 33.4 |
| r4 = | −43.158 | d4 = | 0.22 | | | | |
| r5 = | −62.946 | d5 = | 5.57 | n3 = | 1.67339 | ν3 = | 30.1 |
| r6 = | −19.918 | d6 = | 1.50 | n4 = | 1.79894 | ν4 = | 34.3 |
| r7 = | 65.807 | d7 = | 3.21 | n5 = | 1.84997 | ν5 = | 23.0 |
| r8 = | 371.248 | d8 = | 11.71 | | | | |
| r9 = | 502.294 | d9 = | 9.51 | n6 = | 1.60401 | ν6 = | 61.2 |
| r10 = | −30.217 | d10 = | 0.15 | | | | |
| r11 = | −173.967 | d11 = | 1.80 | n7 = | 1.85000 | ν7 = | 23.0 |
| r12 = | 87.549 | d12 = | 2.10 | | | | |
| r13 = | 0.000 | d13 = | 2.00 | n8 = | 1.45867 | ν8 = | 67.9 |

(Diffraction surface)

r14 = 0.000

Phase Coefficient of Diffraction Surface $C_1 = 2.0233 \cdot 10^{-4}$   $C_2 = -3.6931 \cdot 10^{-7}$   $C_3 = 2.0416 \cdot 10^{-10}$

Numerical Embodiment 5
f = −88.93161   Magnification 2.818

| | | | | | | | |
|---|---|---|---|---|---|---|---|
| r1 = | 73.726 | d1 = | 1.35 | n1 = | 1.88408 | ν1 = | 40.2 |
| r2 = | 25.553 | d2 = | 1.21 | | | | |
| r3 = | 90.501 | d3 = | 3.20 | n2 = | 1.55267 | ν2 = | 44.7 |
| r4 = | −41.603 | d4 = | 1.10 | | | | |
| r5 = | −301.462 | d5 = | 4.57 | n3 = | 1.69540 | ν3 = | 48.7 |
| r6 = | −23.140 | d6 = | 1.50 | n4 = | 1.88500 | ν4 = | 41.0 |
| r7 = | 19.735 | d7 = | 5.53 | n5 = | 1.81411 | ν5 = | 24.0 |
| r8 = | 909.322 | d8 = | 20.98 | | | | |
| r9 = | 0.000 | d9 = | 1.80 | n6 = | 1.45867 | ν6 = | 67.9 |
| r10 = | 0.000 | d10 = | 0.24 | | | | |

(Diffraction surface)

| | | | | | | | |
|---|---|---|---|---|---|---|---|
| r11 = | −2299.399 | d11 = | 5.06 | n7 = | 1.48918 | ν7 = | 68.9 |
| r12 = | −28.465 | d12 = | 0.15 | | | | |
| r13 = | −101.855 | d13 = | 1.75 | n8 = | 1.86111 | ν8 = | 26.8 |
| r14 = | 227.349 | | | | | | |

Phase Coefficient of Diffraction Surface $C_1 = 2.1811 \cdot 10^{-4}$   $C_2 = -7.8087 \cdot 10^{-7}$   $C_3 = 1.4921 \cdot 10^{-9}$

Numerical Embodiment 6
f = −84.94653   Magnification 2.818

| | | | | | | | |
|---|---|---|---|---|---|---|---|
| r1 = | 75.870 | d1 = | 1.35 | n1 = | 1.88247 | ν1 = | 38.9 |
| r2 = | 25.334 | d2 = | 1.13 | | | | |
| r3 = | 72.844 | d3 = | 3.17 | n2 = | 1.55635 | ν2 = | 44.0 |
| r4 = | −41.600 | d4 = | 0.15 | | | | |
| r5 = | −242.682 | d5 = | 3.18 | n3 = | 1.70773 | ν3 = | 53.6 |
| r6 = | −24.910 | d6 = | 1.50 | n4 = | 1.88500 | ν4 = | 41.0 |
| r7 = | 20.049 | d7 = | 5.05 | n5 = | 1.82224 | ν5 = | 23.7 |
| r8 = | 623.450 | d8 = | 24.01 | | | | |
| r9 = | −1377.742 | d9 = | 7.09 | n6 = | 1.48700 | ν6 = | 70.4 |
| r10 = | −28.991 | d10 = | 0.15 | | | | |
| r11 = | −106.051 | d11 = | 1.75 | n7 = | 1.86665 | ν7 = | 29.2 |
| r12 = | 178.777 | d12 = | 4.21 | | | | |
| r13 = | 0.000 | d13 = | 1.80 | n8 = | 1.45867 | ν8 = | 67.9 |

(Diffraction surface)

r14 = 0.000

Phase Coefficient of Diffraction Surface $C_1 = 2.2705 \cdot 10^{-4}$   $C_2 = -5.8964 \cdot 10^{-7}$   $C_3 = 1.1514 \cdot 10^{-9}$

Numerical Embodiment 7
f = −163.00569   Magnification 1.41

| | | | | | | | |
|---|---|---|---|---|---|---|---|
| r1 = | −985.334 | d1 = | 1.80 | n1 = | 1.86985 | ν1 = | 42.0 |
| r2 = | 26.081 | d2 = | 7.11 | n2 = | 1.61656 | ν2 = | 35.0 |
| r3 = | −52.874 | d3 = | 11.12 | | | | |
| r4 = | −25.019 | d4 = | 8.22 | n3 = | 1.50254 | ν3 = | 61.3 |
| r5 = | −25.769 | d5 = | 0.15 | | | | |
| r6 = | −103.139 | d6 = | 1.80 | n4 = | 1.87731 | ν4 = | 35.1 |
| r7 = | 78.148 | d7 = | 0.15 | | | | |
| r8 = | 44.776 | d8 = | 4.71 | n5 = | 1.60442 | ν5 = | 61.1 |
| r9 = | 402.431 | d9 = | 0.55 | | | | |
| r10 = | 0.000 | d10 = | 1.80 | n6 = | 1.45867 | ν6 = | 67.9 |

(Diffraction surface)

r11 = 0.000

Phase Coefficient of Diffraction Surface $C_1 = 1.8721 \cdot 10^{-4}$   $C_2 = -2.5668 \cdot 10^{-7}$   $C_3 = 3.9364 \cdot 10^{-10}$

Numerical Embodiment 8
f = −118.71839   Magnification 1.409

| | | | | | | | |
|---|---|---|---|---|---|---|---|
| r1 = | 183.395 | d1 = | 1.80 | n1 = | 1.87422 | ν1 = | 41.7 |

(Diffraction surface)

| | | | | | | | |
|---|---|---|---|---|---|---|---|
| r2 = | 23.190 | d2 = | 6.57 | n2 = | 1.69211 | ν2 = | 29.0 |
| r3 = | −107.513 | d3 = | 8.76 | | | | |
| r4 = | −28.533 | d4 = | 4.76 | n3 = | 1.56794 | ν3 = | 41.7 |
| r5 = | −27.199 | d5 = | 0.15 | | | | |
| r6 = | −68.520 | d6 = | 1.80 | n4 = | 1.86411 | ν4 = | 28.1 |
| r7 = | 57.230 | d7 = | 0.15 | | | | |
| r8 = | 43.236 | d8 = | 5.18 | n5 = | 1.48784 | ν5 = | 69.8 |
| r9 = | −142.130 | d9 = | 0.15 | | | | |
| r10 = | 0.000 | d10 = | 0.80 | n6 = | 1.45867 | ν6 = | 67.9 |

(Diffraction surface)

r11 = 0.000

Phase Coefficient of Diffraction Surface

Surface r1
$C_1 = -3.1800 \cdot 10^{-4}$   $C_2 = -3.4465 \cdot 10^{-7}$   $C_3 = 7.9741 \cdot 10^{-10}$
Surface r10
$C_1 = 6.5269 \cdot 10^{-4}$   $C_2 = 2.0727 \cdot 10^{-7}$   $C_3 = -2.0294 \cdot 10^{-10}$ -continued Numerical Embodiment 9
f = −85.92015    Magnification 1.993

| | | | | | | | |
|---|---|---|---|---|---|---|---|
| r1 = | 69.937 | d1 = | 1.50 | n1 = | 1.88500 | v1 = | 41.0 |
| | | | (Diffraction surface) | | | | |
| r2 = | 26.639 | d2 = | 0.94 | | | | |
| r3 = | 41.805 | d3 = | 3.80 | n2 = | 1.58405 | v2 = | 39.1 |
| r4 = | −85.853 | d4 = | 0.15 | | | | |
| r5 = | 427.403 | d5 = | 3.70 | n3 = | 1.71857 | v3 = | 47.1 |
| r6 = | −38.498 | d6 = | 1.60 | n4 = | 1.88500 | v4 = | 41.0 |
| r7 = | 20.381 | d7 = | 4.50 | n5 = | 1.79808 | v5 = | 24.4 |
| r8 = | 121.800 | d8 = | 24.21 | | | | |
| r9 = | −606.504 | d9 = | 5.73 | n6 = | 1.49933 | v6 = | 64.4 |
| r10 = | −30.233 | d10 = | 0.15 | | | | |
| r11 = | −145.330 | d11 = | 1.80 | n7 = | 1.85000 | v7 = | 23.0 |
| r12 = | 105.029 | d12 = | 12.01 | | | | |
| r13 = | 0.000 | d13 = | 2.00 | n8 = | 1.45867 | v8 = | 67.9 |
| | | | (Diffraction surface) | | | | |
| r14 = | 0.000 | | | | | | |

Phase Coefficient of Diffraction Surface

Surface r1
$C_1 = -1.2863 \cdot 10^{-4}$  $C_2 = -1.6591 \cdot 10^{-7}$  $C_3 = 7.4764 \cdot 10^{-11}$
Surface r13
$C_1 = 4.7734 \cdot 10^{-4}$  $C_2 = -3.1659 \cdot 10^{-7}$  $C_3 = 8.4246 \cdot 10^{-11}$ Numerical Embodiment 10
f = −79.42570    Magnification 2.818

| | | | | | | | |
|---|---|---|---|---|---|---|---|
| r1 = | 69.020 | d1 = | 1.35 | n1 = | 1.88500 | v1 = | 41.0 |
| | | | (Diffraction surface) | | | | |
| r2 = | 25.582 | d2 = | 1.05 | | | | |
| r3 = | 64.506 | d3 = | 3.04 | n2 = | 1.55537 | v2 = | 44.2 |
| r4 = | −52.053 | d4 = | 0.15 | | | | |
| r5 = | 208.988 | d5 = | 3.09 | n3 = | 1.63160 | v3 = | 39.5 |
| r6 = | −33.007 | d6 = | 1.50 | n4 = | 1.88500 | v4 = | 41.0 |
| r7 = | 17.970 | d7 = | 6.35 | n5 = | 1.78620 | v5 = | 24.8 |
| r8 = | 154.767 | d8 = | 22.12 | | | | |
| r9 = | 0.000 | d9 = | 1.80 | n6 = | 1.45867 | v6 = | 67.9 |
| r10 = | 0.000 | d10 = | 0.25 | | | | |
| | | | (Diffraction surface) | | | | |
| r11 = | −1618.066 | d11 = | 4.88 | n7 = | 1.49366 | v7 = | 66.1 |
| r12 = | −27.750 | d12 = | 0.15 | | | | |
| r13 = | −90.539 | d13 = | 1.75 | n8 = | 1.85929 | v8 = | 26.1 |
| r14 = | 201.050 | | | | | | |

Phase Coefficient of Diffraction Surface

Surface r1
$C_1 = -2.1263 \cdot 10^{-4}$  $C_2 = -1.6994 \cdot 10^{-7}$  $C_3 = 1.9815 \cdot 10^{-10}$
Surface r10
$C_1 = 3.8130 \cdot 10^{-4}$  $C_2 = -7.2944 \cdot 10^{-7}$  $C_3 = 1.3961 \cdot 10^{-9}$ <Values of Conditional Expressions in Embodiments>

| Conditional Expression | Embodiment 1 | Embodiment 2 | Embodiment 3 |
|---|---|---|---|
| $\phi_D$ | −0.0005912 | −0.0007353 | −0.0003743 |
| $\phi_R$ | −0.0105600 | −0.0110800 | −0.0038320 |
| $\phi_D/\phi_R$ | 0.0560 | 0.0664 | 0.1236 |
| $h_D$ | 0.100362 | 0.070589 | 0.111842 |
| $H_D$ | 0.564141 | 0.678097 | 0.654795 |
| $|h_D\ H_D|$ | 0.056618 | 0.047866 | 0.073234 |
| $h_D^2$ | 0.010073 | 0.004983 | 0.012509 |
| $|h_D\ H_D|/h_D^2$ | 5.621 | 9.606 | 5.855 |

| Conditional Expression | Embodiment 4 | Embodiment 5 | Embodiment 6 |
|---|---|---|---|
| $\phi_D$ | −0.0004047 | −0.0004362 | −0.0004541 |
| $\phi_R$ | −0.0032750 | −0.0112400 | −0.0117700 |
| $\phi_D/\phi_R$ | 0.1236 | 0.0388 | 0.0386 |
| $h_D$ | 0.099923 | 0.134458 | 0.121838 |
| $H_D$ | 0.718828 | 0.419177 | 0.466374 |
| $|h_D\ H_D|$ | 0.071827 | 0.056362 | 0.056822 |
| $h_D^2$ | 0.009985 | 0.018079 | 0.014844 |
| $|h_D\ H_D|/h_D^2$ | 7.194 | 3.118 | 3.828 |

| Conditional Expression | Embodiment 7 | Embodiment 8 | Embodiment 9 | Embodiment 10 |
|---|---|---|---|---|
| $\phi_D$ | −0.0003744 | −0.0013050 | −0.0009547 | −0.0007626 |
| $\phi_R$ | −0.0061350 | −0.0084230 | −0.0116400 | −0.0125900 |
| $\phi_D/\phi_R$ | 0.0610 | 0.1549 | 0.0820 | 0.0606 |
| $h_D$ | 0.099606 | 0.099582 | 0.070590 | 0.126136 |
| $H_D$ | 0.641016 | 0.574078 | 0.666514 | 0.409064 |
| $|h_D\ H_D|$ | 0.063849 | 0.057168 | 0.047049 | 0.051598 |
| $h_D^2$ | 0.009921 | 0.009917 | 0.004983 | 0.015910 |
| $|h_D\ H_D|/h_D^2$ | 6.436 | 5.765 | 9.442 | 3.243 |

FIGS. 13A through 13D show the aberration of master lens M, and FIG. FIGS. 14A–14D through FIGS. 23A–23D show the aberrations of the attachment lenses in numerical embodiments 1 through 10.

Some of the methods for forming the diffraction surfaces that are relatively suited for the mass production of diffraction gratings include: a method in which glass is press-formed using a metal mold or the like while melting the glass at a high temperature; a method in which an ultraviolet-curing plastic resin or the like is press-formed, using a mold, on the surface of a glass substrate or the like, then ultraviolet rays are applied to cure the resin; a method in which a plastic resin itself is formed using a mold; a method in which a diffraction grating is formed by directly machining glass or the like; and a method in which a stepped diffraction grating is formed by wet-etching or dry-etching a plane substrate of $SiO_2$ or the like.

Figure 24:
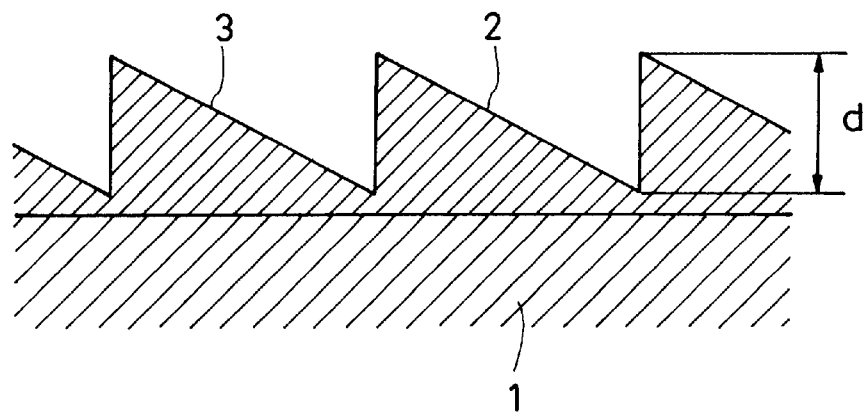
FIG. 24 is a diagram showing the configuration of a single-layer diffraction optical element.
Figure 25:
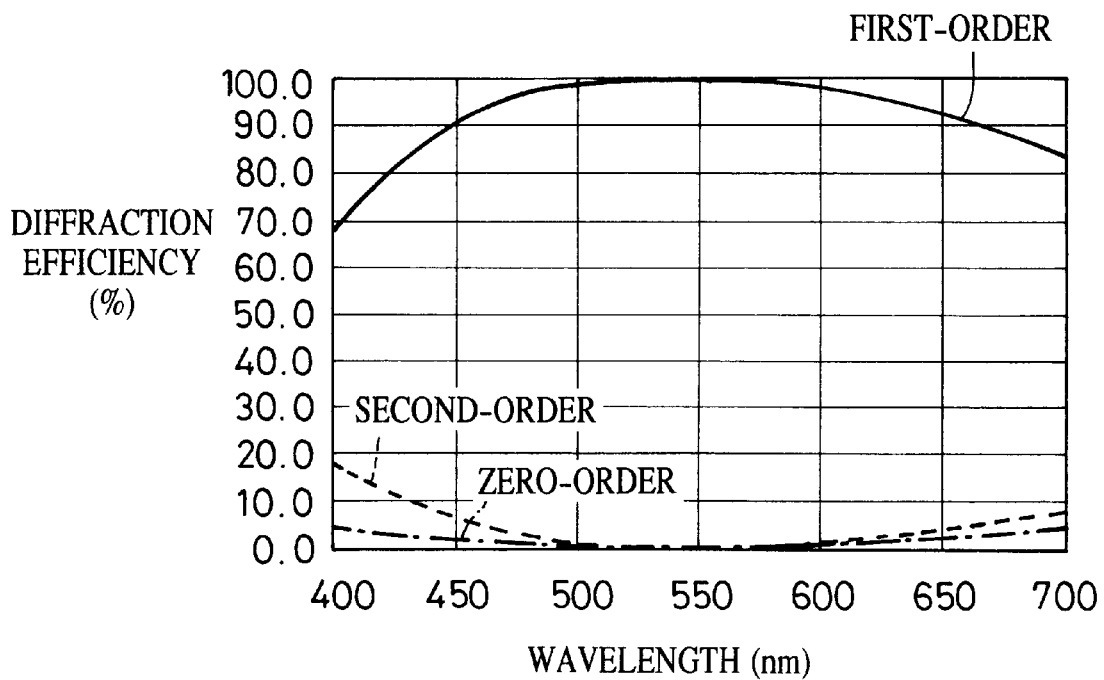
FIG. 25 is a graph showing diffraction efficiency of the single-layer diffraction optical element.
Figure 26:
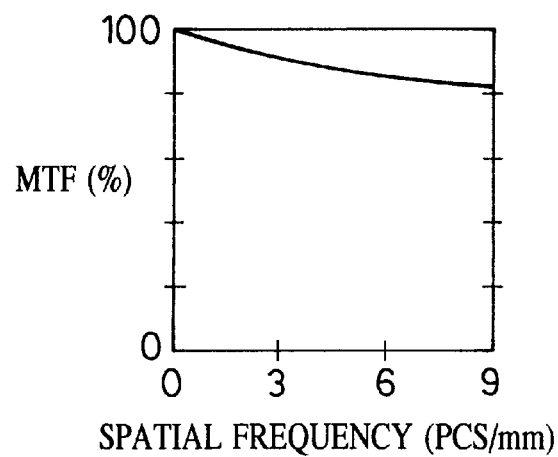
FIG. 26 is a graph showing an MTF characteristic of the first embodiment in relation to spatial frequency when the single-layer diffraction optical element is used.

The diffraction gratings of the diffraction surfaces have the kinoform configuration shown in FIG. 24. An actual diffraction grating is formed by applying an ultraviolet-curing resin to the surface of a base material 1, and a diffraction grating 3 having grating thickness d is formed on a resin component 2 such that the first-order diffraction efficiency is 100% at a wavelength of 530 nm. FIG. 25 shows how the first-order diffraction efficiency of a diffraction optical element shown in FIG. 24 depends on wavelength. As is obvious from FIG. 25, the diffraction efficiency at the design order deteriorates as the wavelength deviates from the optimized wavelength 530 nm, while a diffracted light ray of the zero-order and second-order in the vicinity of the design order increases. The increases in the diffracted light rays of the orders other than the design order are responsible for flare that leads to deteriorated resolution of an optical system. FIG. 26 shows the MTF characteristic in relation to spatial frequency in the case described above, revealing that the MTF is lower in a lower-frequency zone.

Figure 27:
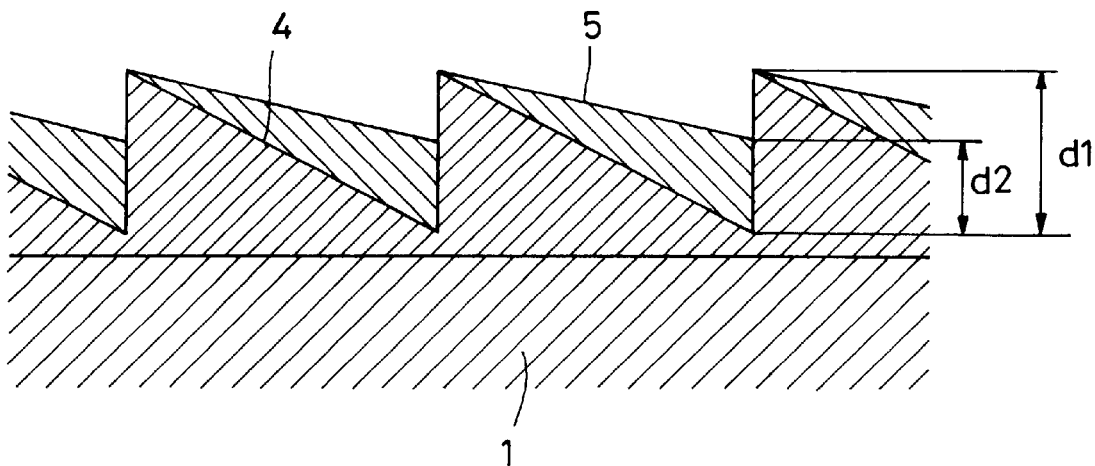
FIG. 27 is a graph showing the configuration of a multi-layer diffraction optical element.

The MTF in the lower-frequency zone can be increased by employing the multi-layer diffraction grating shown in FIG. 27 for the diffraction grating of the diffraction optical element. To be more specific, a first diffraction grating 4 composed of an ultraviolet-curing resin (nd=1.499, vd=54) is formed on the base material 1, then a second diffraction grating 5 composed of another type of ultraviolet-curing resin (nd=1.598, vd=28) is formed thereupon. In this combination of the constituents, grating thickness d1 of the first diffraction grating 4 is set to 13.8 μm, and grating thickness d2 of the second diffraction grating 5 is set to 10.5 μm.

Figure 28:
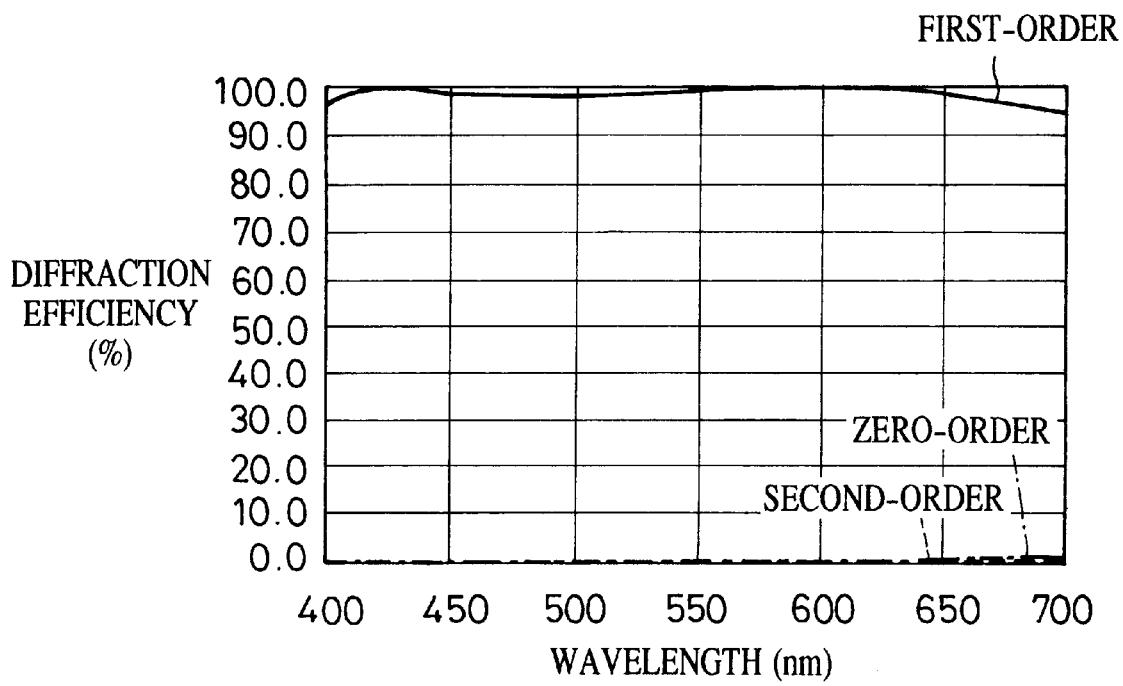
FIG. 28 is a graph showing diffraction efficiency of the multi-layer diffraction optical element.
Figure 29:
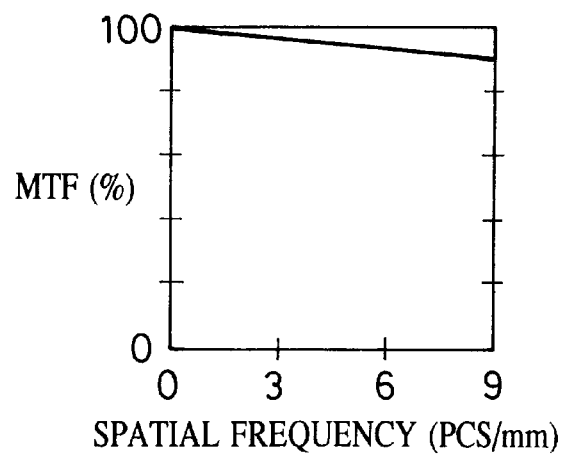
FIG. 29 is a graph showing an MTF characteristic of the first embodiment in relation to spatial frequency when the multi-layer diffraction optical element is used.

FIG. 28 shows the dependency of the first-order diffraction efficiency of the diffraction optical element having the foregoing construction upon wavelength. The use of the multi-layer diffraction grating provides the high diffraction efficiency at the design order, 95% or more, over the whole operating wavelength range. FIG. 29 shows the MTF characteristic in relation to the spatial frequency in the case mentioned above, revealing that the use of the multi-layer diffraction grating improves the MTF at lower frequencies and a desired MTF characteristic is obtained.

Thus, the optical performance is further improved by employing the multi-layer diffraction grating for the diffraction optical element.

Figure 30:
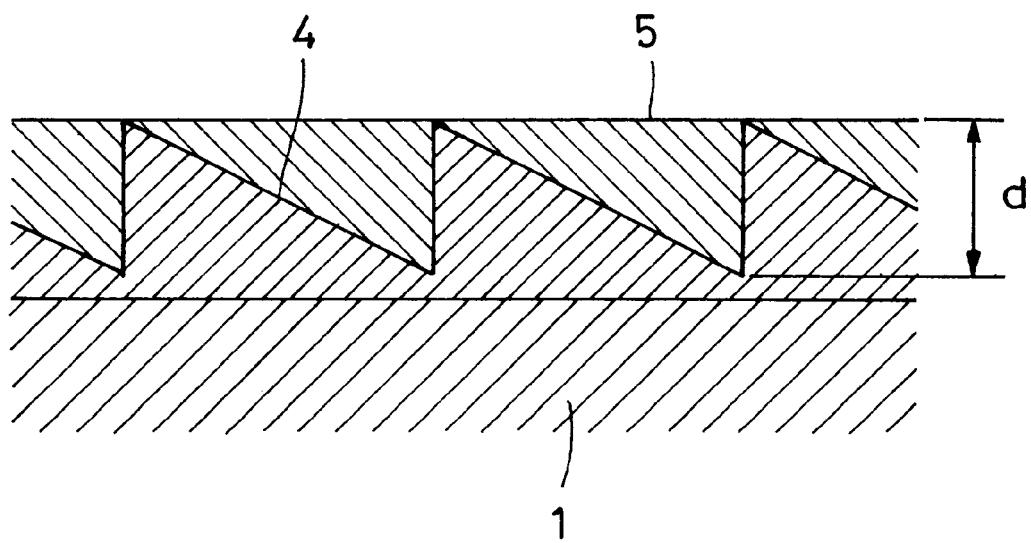
FIG. 30 is a graph showing the configuration of another multi-layer diffraction optical element.

The material used for the foregoing multi-layer diffraction optical element is not limited to the ultraviolet-curing resin; other type of a plastic material may be used, or the first diffraction grating 4 may be directly formed on the base material 1, depending on the type of the base material 1. The thickness of the gratings may not necessarily be different; the thickness of the two diffraction gratings 4 and 5 may be the same as shown in FIG. 30, depending on the combination of the materials. In this case, the gratings are not formed on the surface of the diffraction optical element, making it possible to provide cheaper optical systems featuring good dust resistance and easier assembly of the diffraction optical elements.

Thus, the attachment lens provided with a diffraction surface in accordance with the present invention provides high performance since it has lateral chromatic aberration satisfactorily corrected.

What is claimed is:

1. An attachment lens whose refractive power is negative, comprising a diffraction surface which has a negative refractive power.

2. An attachment lens according to claim 1, further comprising a plurality of said diffraction surfaces each of which has the negative refractive power.

3. An attachment lens according to claim 1, further comprising a diffraction surface which has a positive refractive power.

4. An attachment lens according to claim 1, wherein said diffraction surface is formed on a transparent plate.

5. An attachment lens whose refractive power is negative, comprising a diffraction surface which has a negative refractive power, wherein said attachment lens is attached to an image side of a photographic lens and said diffraction surface corrects a lateral chromatic aberration of said lenses.

6. An attachment lens according to claim 5, further comprising a plurality of said diffraction surfaces each of which has the negative refractive power.

7. An attachment lens according to claim 5, further comprising a diffraction surface which has a positive refractive power.

8. An attachment lens according to claim 5, wherein said diffraction surface is formed on a transparent plate.

9. An attachment lens which is installed on an image surface side of a photographic lens, which extends a focal length of an optical system toward a longer focal length side, said attachment lens comprising at least one diffraction surface whose shape is rotationally symmetrical with respect to an optical axis, wherein said at least one of said diffraction surface has a negative refractive power and satisfies a conditional expression given below when a height of an axial paraxial ray incident upon said diffraction surface from an optical axis is denoted as $h_D$, and a height of a pupil paraxial ray incident upon said diffraction surface from said optical axis is denoted as $H_D$:

$$|h_D H_D| > h_D^2.$$

10. An attachment lens which is installed on an image side of a photographic lens, which extends a focal length of an optical system toward a longer focal length side, said attachment lens comprising at least one diffraction surface whose shape is rotationally symmetrical with respect to an optical axis, wherein said at least one of said diffraction surfaces has a negative refractive power and satisfies a conditional expression given below when a height of an axial paraxial ray incident upon said diffraction surface from an optical axis is denoted as $h_D$, and a height of a pupil paraxial ray incident upon said diffraction surface from said optical axis is denoted as $H_D$:

$$|h_D H_D| > h_D^2$$

and said attachment lens satisfies a conditional expression given below when a means refractive power of said diffraction surface having the negative refractive power is denoted as $\phi_D$, and a refractive power of a rear attachment lens obtained when an order of diffraction of said diffraction surface is selected as a design order of diffraction is denoted as $\phi_R$:

$$0.01 > \phi_D/\phi_R < 0.3.$$

11. A lens assembly comprising an attachment lens described in any one of claim 1 to 10, 13, and 14, and a photographic lens that allows said attachment lens to be mounted on an image surface thereof.

12. A camera system comprising said lens assembly described in claim 11 and a camera body.

13. An attachment lens according to claim 1, wherein said diffraction surface is formed on a lens.

14. An attachment lens according to claim 5, wherein said diffraction surface is formed on a lens.

* * * * *

UNITED STATES PATENT AND TRADEMARK OFFICE
CERTIFICATE OF CORRECTION

PATENT NO. : 6,124,981
DATED : September 26, 2000
INVENTOR(S) : Hideki Ogawa

Page 1 of 1

It is certified that error appears in the above-identified patent and that said Letters Patent is hereby corrected as shown below:

Column 3,
Line 27, 29, 31, 33, 35, 37, 39, 41, 43, 45 and 47, "diagram" should read -- diagrams --.

Column 5,
Line 2, "$h_M H_{M\ M}/\nu_M < 0.$" should read -- $h_M H_M \varnothing_M/\nu_M < 0.$ --.

Column 12,
Line 17, "FIG." should be deleted.

Column 13,
Line 6, "¶ Thus," should read -- Thus, --.

Column 14,
Line 5, "surface" should read -- surfaces --.
Line 31, "means" should read -- mean --.
Line 39, "$0.01 > \varnothing_D/\varnothing_R < 0.3$" should read -- $0.01 < \varnothing_D/\varnothing_R < 0.3$ --.

Signed and Sealed this

Twenty-first Day of May, 2002

*Attest:*

*Attesting Officer*

JAMES E. ROGAN
*Director of the United States Patent and Trademark Office*